United States Patent
So et al.

(10) Patent No.: US 8,656,110 B2
(45) Date of Patent: Feb. 18, 2014

(54) NON-VOLATILE STORAGE DEVICE, ACCESS DEVICE, AND NON-VOLATILE STORAGE SYSTEM FOR RELEASING A CACHE OBJECT IN ACCORDANCE WITH A DATA MATCHING FLAG

(75) Inventors: Hirokazu So, Kyoto (JP); Takuji Maeda, Osaka (JP); Masayuki Toyama, Osaka (JP)

(73) Assignee: Panasonic Corporation, Osaka (JP)

( * ) Notice: Subject to any disclaimer, the term of this patent is extended or adjusted under 35 U.S.C. 154(b) by 466 days.

(21) Appl. No.: 13/130,360

(22) PCT Filed: Aug. 10, 2010

(86) PCT No.: PCT/JP2010/005017
§ 371 (c)(1),
(2), (4) Date: May 20, 2011

(87) PCT Pub. No.: WO2011/021367
PCT Pub. Date: Feb. 24, 2011

(65) Prior Publication Data
US 2011/0225370 A1 Sep. 15, 2011

(30) Foreign Application Priority Data

Aug. 21, 2009 (JP) ................. 2009-191994

(51) Int. Cl.
*G06F 12/00* (2006.01)
(52) U.S. Cl.
USPC ............ 711/135; 711/141; 711/144; 711/156
(58) Field of Classification Search
USPC .................. 711/135, 141, 144, 156
See application file for complete search history.

(56) References Cited

U.S. PATENT DOCUMENTS

| | | | |
|---|---|---|---|
| 2002/0124129 A1* | 9/2002 | Zilberman | .................... 711/103 |
| 2006/0155920 A1 | 7/2006 | Smith et al. | |
| 2006/0155921 A1 | 7/2006 | Gorobets et al. | |
| 2006/0155922 A1 | 7/2006 | Gorobets et al. | |
| 2006/0161722 A1 | 7/2006 | Bennett et al. | |
| 2006/0218347 A1 | 9/2006 | Oshima | |

(Continued)

FOREIGN PATENT DOCUMENTS

| JP | 2004-326165 A | 11/2004 |
|---|---|---|
| JP | 2006-268776 A | 10/2006 |

(Continued)

OTHER PUBLICATIONS

International Search Report for corresponding International Application No. PCT/JP2010/005017 mailed Nov. 16, 2010.

*Primary Examiner* — John Lane
(74) *Attorney, Agent, or Firm* — Renner, Otto, Boisselle & Sklar, LLP

(57) ABSTRACT

When multiple pieces of content data are being recorded continuously to a nonvolatile storage device having page cache function, a preparation time before starting next content data recording is reduced. When a cache releasing section of a nonvolatile storage device (1) receives cache releasing from an access device (2), it releases addresses included in one logical block among multiple addresses which are cache objects at the same time. Further, the nonvolatile storage device (1) includes a cache information outputting section which outputs information regarding a time period required for releasing addresses which are cache objects outside, and the access device (2) refers to the information to select the address to be an object of releasing.

4 Claims, 15 Drawing Sheets

(56) References Cited

U.S. PATENT DOCUMENTS

| | | |
|---|---|---|
| 2007/0118688 A1* | 5/2007 | Lee et al. .................. 711/113 |
| 2007/0214309 A1 | 9/2007 | Matsuura et al. |
| 2007/0283081 A1 | 12/2007 | Lasser |
| 2008/0195798 A1* | 8/2008 | Lee et al. .................. 711/103 |
| 2008/0301359 A1 | 12/2008 | Smith et al. |
| 2010/0037009 A1 | 2/2010 | Yano et al. |
| 2010/0037010 A1 | 2/2010 | Yano et al. |
| 2010/0037011 A1 | 2/2010 | Yano et al. |
| 2010/0037012 A1 | 2/2010 | Yano et al. |
| 2010/0332717 A1 | 12/2010 | Maeda et al. |
| 2012/0173807 A1* | 7/2012 | Lasser .................. 711/103 |

FOREIGN PATENT DOCUMENTS

| | | |
|---|---|---|
| JP | 2007-241576 A | 9/2007 |
| JP | 2009-110548 A | 5/2009 |
| WO | 2009/084724 A1 | 7/2009 |
| WO | 2009/107393 A1 | 9/2009 |

\* cited by examiner

| Page cache management table | | | | | | |
|---|---|---|---|---|---|---|
| Page cache number | Use flag | Logical block number | Logical page number | Data matching flag | Releasing reservation flag | Update counter |
| 0 | ON | 0x031A | 0x00 | OFF | OFF | 0x3F |
| 1 | ON | 0x0053 | 0x00 | ON | OFF | 0x01 |
| 2 | ON | 0x21FE | 0x08 | OFF | OFF | 0xFF |
| 3 | ON | 0x031A | 0x01 | ON | OFF | 0x71 |
| 4 | ON | 0x1028 | 0x7F | OFF | OFF | 0x62 |
| 5 | ON | 0x21FE | 0x3F | OFF | OFF | 0x08 |
| 6 | OFF | N/A | | | | |
| 7 | OFF | N/A | | | | |

| | |
|---|---|
| Physical block number | 0x0018 |
| Next page number to write | 0x40 |

NON-VOLATILE STORAGE DEVICE, ACCESS DEVICE, AND NON-VOLATILE STORAGE SYSTEM FOR RELEASING A CACHE OBJECT IN ACCORDANCE WITH A DATA MATCHING FLAG

TECHNICAL FIELD

The present invention relates to a memory controller for controlling a nonvolatile memory, a nonvolatile storage device such as a semiconductor memory card or the like including a nonvolatile memory and a memory controller, an access device which accesses a nonvolatile storage device, and a nonvolatile storage system including the same.

BACKGROUND ART

A demand for nonvolatile storage devices including rewritable nonvolatile memories, mainly semiconductor memory cards, is increasing. The semiconductor memory cards are expensive compared to the optical discs, tape media, and the like. However, since the semiconductor memory cards have significant merits such as, smallness, lightness, quake resistance, convenience in handling, and the like, the demand as recording media for portable devices such as digital still cameras, mobile phones, and the like has been rising. Recently, they are also used as recording media for consumer video recording device, and professional video recording device for broadcasting stations. Further, not only portable devices but also stationary appliances such as digital televisions, DVD recorders and the like are equipped with slots for the semiconductor memory cards as standard, recently, and the demand for the semiconductor memory cards is further growing.

A semiconductor memory card includes a flash memory (mainly of a NAND type) as a nonvolatile main storage memory, and also has a memory controller for controlling the memory. The memory controller performs data read/write control for the flash memory in response to a data read/write instruction from an access device, typically, a main body of a digital still camera, or the like.

An access device manages storage regions of the semiconductor memory cards with a file system such as a FAT file system or the like. With the file system, the semiconductor memory cards store directory entries, FAT and the like which are management information of the file system in addition to file data themselves such as AV contents.

In case of an access device storing content files of a large capacity, such as high definition videos, to a semiconductor memory card in real time, it is desirable to activate data of as latest as possible when an unexpected event such as power supply disconnection occurs. Usually, written file data is recognized as valid data in the file system after the directory entry and FAT are appropriately updated. Thus, it is general for an access device to record data on a semiconductor memory card by repeating a procedure of preferentially writing file data of a certain amount into the semiconductor memory card and then updating a directory entry and FAT.

When an access device is recording high vision videos with a high video bit rate on a semiconductor memory card, it updates a directory entry and FAT in a rate of once in few seconds, for example. In such a case, recording size of the file data is relatively large, i.e., about few megabytes (MB). However, with respect to the directory entry and FAT, only the portion of which information is updated is written to the semiconductor memory card, and thus, the recording size thereof is relatively small, i.e., about 512 bytes to 32 kilobytes (KB).

Before recording new data, data on a flash memory has to be erased. The unit of erasing is about few hundred KB to few MB, currently. However, there is tendency of increasing. When data of a small size is written into a flash memory, valid data existing in the same physical block is copied to another physical block. This is called a "saving process". Thus, the flash memory has a problem that recording speed decreases when data is written in the unit smaller than the erasing unit, and, particularly, the recording speed decreases significantly when the management information of the file system such as the directory entry and FAT is being written.

Conventionally, in order to solve such a problem, a method of incorporating page cache into a semiconductor memory card has been proposed (see, for example, Patent Literature 1).

In such a method (conventional technique), a writing process to a specific logical address for data of a small size (management information) is performed with respect to a physical block for temporarily holding data (physical block for page cache (cache block)) and managed in order to prevent a useless saving process from occurring and to increase the speed of the writing process.

CITATION LIST

Patent Literature

Patent Literature 1: Laid-Open Patent Publication No. 2004-326165

SUMMARY

Technical Problem

However, the conventional technique has the following problems.

When an access device records multiple pieces of content data (for example, data of high vision videos, or the like) on a nonvolatile storage device such as a semiconductor memory card or the like, each of the content data is recorded as a separate file in general. This is because management of reproducing, editing or the like of the recorded content data is easy. Further, various information accompanied with the content data (for example, names, thumbnail images, time search tables, bit rates, reproduction time, encoding information and the like) are recorded to the nonvolatile storage device as separate management information files associated to each of the content data in many cases for the same reason.

The directory entries and/or FATs of the content data, or the directory entries and/or FATs of the management information files may be processed with page cache to prevent the saving process from occurring, and thus, data writing process with high speed can be achieved.

However, for example, in case where an access device records multiple pieces of content data continuously in real time to a nonvolatile storage device, logical addresses of the directory entries and/or FATs change when the content data being recorded is switched. Accordingly, the logical address set as an object area of page caching has to be altered.

There is a limit in logical addresses which can be registered as page cache. Therefore, for recording multiple pieces of content data continuously in real time as mentioned above, there may be a case where data corresponding to a logical address which has been already set as a page cache area has to be moved outside the page cache. A process of moving data in page cache is described with reference to FIG. 16. FIG. 16 is a diagram for illustrating a case where two pieces of data which are objects of page cache, i.e., "data X__1" (data of logical block number "X" and logical page number "1") and "data Y__3" (data of logical block number "Y" and logical page number "3") are excluded from the objects of page cache and data are moved. Specifically, FIG. 16A shows movement of page cache object data "data X__1", and FIG. 16B shows movement of page cache object data "data Y__3".

As shown in FIG. 16A, for moving the page cache object data "data X__1", following processes (1) through (3) have to be performed.
(1) Obtain a free block (empty physical block, physical address "0x000A").
(2) Perform a writing process of "data X__1" which is an object of page cache to the obtained free block (physical address "0x000A") (a process of "copy 1" of FIG. 16A).
(3) Perform a copy process of "data X__2" through "data X_N", i.e., data of logical block "X" which are not objects of cache (in case of FIG. 16A, "data X__1" through "data X_N" are stored in a data block (physical address "0x0516")), to the obtained free block (physical address "0x000A") (so-called a "saving process") (a process of "copy 2" of FIG. 16A).

In this way, the process of moving page cache object data "data X__1" is performed. As shown in FIG. 16B, for moving page cache object data "data Y__3", following processes (1) through (4) have to be performed.
(1) Obtain a free block (empty physical block, physical address "0x000B").
(2) Perform a copy process of "data Y__1" and "data Y__2", i.e., data of logical block "Y" which are not objects of cache (in case of FIG. 16B, "data Y__1" through "data Y_N" are stored in a data block (physical address "0x0520")), to the obtained free block (physical address "0x000B") (a process of "copy 1" of FIG. 16B).
(3) Perform a writing process of "data Y__3" which is an object of page cache to the obtained free block (physical address "0x000B") (a process of "copy 2" of FIG. 16B).
(4) Perform a copy process of "data Y__4" through "data Y_N", i.e., data of logical block "Y" which are not objects of cache, to the obtained free block (physical address "0x000B") (so-called a "saving process") (a process of "copy 3" of FIG. 16B).

In this way, the process of moving page cache object data "data Y__3" is performed.

As described above, a process of moving data of page cache requires a number of copy processes. Thus, a long processing time is required.

Although it depends on types of a flash memory to be used and/or architecture of a semiconductor memory card, the saving process usually requires a relatively long time, for example, 200 milliseconds to 300 milliseconds. Further, if logical addresses of multiple page caches are to be changed, a time period required for the process is an accumulated time of the processes for the each of the page caches. As a result, a preparation time period for recording next content data becomes long, and possibility of insufficient buffer memory in an access device for temporarily holding data of the next content data rises. This is undesirable because, when the buffer memory in the access device for temporarily holding data of the next content data is insufficient, data of a part of the content (for example, high definition videos) which is to be recorded by the access device to the nonvolatile storage device will be missed. If a buffer memory of a large capacity is incorporated into an access device in order to prevent data from being missed in such a way, the cost increases. Thus, it is also undesirable to incorporate a buffer memory of a large capacity to an access device.

The present invention is to solve the above problems, and an object thereof is to provide a nonvolatile storage device, an access device, and a nonvolatile storage system which can efficiently perform a process of changing a cache object region provided on a nonvolatile memory.

Solution to Problem

The first aspect is a nonvolatile storage device for performing a reading process and/or writing process for data based on an instruction from an access device, including a nonvolatile memory and a memory controller.

The nonvolatile memory includes cache block(s) and data block(s), and is configured to store data.

The memory controller includes a cache registering section, a cache writing section and a cache releasing section, and is configured to control data writing and data reading to and from the nonvolatile memory.

The cache registering section is configured to register a received logical address as a cache object in case of receiving an instruction of cache registration and a logical address of data which is to be a cache object from outside (for example, the access device). The cache writing section is configured to record writing data to the logical address which is registered as the cache object on a or the cache block of the nonvolatile memory. The cache releasing section is configured to release multiple logical addresses included in one logical block from cache objects among multiple logical addresses registered as cache objects when it receives an instruction of cache releasing from outside, in case where there are multiple logical addresses which are registered as cache objects and there are multiple logical addresses included in one logical block.

In this nonvolatile storage device, the cache releasing section releases multiple logical addresses included in one logical block from cache objects among multiple logical addresses registered as cache objects when it receives an instruction of cache releasing from outside, in case where there are multiple logical addresses which are registered as cache objects and there are multiple logical addresses included in one logical block. In other words, in this nonvolatile storage device, data of multiple logical addresses which are the cache objects in the same logical block can be copied to a free block together. Thus, a processing time can be significantly reduced compared to the case where the multiple logical addresses are separately released from the cache objects. As a result, a process to alter an object area of cache provided on the nonvolatile memory can be performed efficiently, and a preparation time for content recording can be reduced.

Further, in this nonvolatile storage device, the cache releasing section can release multiple logical addresses included in one logical block among multiple logical addresses registered as cache objects in synchronization with (in association with) reception of an instruction of cache releasing from outside in case where there are multiple logical addresses registered as cache objects and there are multiple logical addresses included in one logical block. Thus, the cache releasing process can be performed rapidly.

The second aspect is a nonvolatile storage device for performing a reading process and/or writing process for data based on an instruction from an access device, including a nonvolatile memory and a memory controller.

The nonvolatile memory includes cache block(s) and data block(s), and is configured to store data.

The memory controller includes a cache registering section, a cache writing section, a page cache controlling section and a cache releasing section, and is configured to control data writing and data reading to and from the nonvolatile memory.

The cache registering section is configured to register a received logical address as a cache object, in case of receiving an instruction of cache registration and a logical address of data which is to be a cache object from outside. The cache writing section is configured to record writing data to the logical address which is registered as the cache object on a or the cache block of the nonvolatile memory. The page cache controlling section is configured to manage information regarding the logical address registered as the cache object as a page cache management table, and set a data matching flag of logical address A1 to "ON" in case where the logical address A1 managed by the page cache management table as the cache object is copied to a or the data block by a saving process as an original of copy in the saving process so as to reflect a change in the page cache table. The cache releasing section is configured to preferentially release a logical address which is a cache object and has the data matching flag "ON" from cache objects among logical addresses registered as the cache objects when it receives an instruction of cache releasing from outside.

In this nonvolatile storage device, the cache releasing section preferentially releases a logical address which is a cache object and has the data matching flag "ON" from cache objects among logical addresses registered as the cache objects when it receives an instruction of cache releasing from outside. Specifically, in this nonvolatile storage device, the logical address which is the cache object and has the data matching flag "ON" in the page cache management table has the same data in the data block, too. Thus, if there is the logical address which is the cache object and has the data matching flag "ON" in the page cache management table, the cache releasing process can be performed by only altering the use flag from "ON" to "OFF" in the logical address which is the cache object. Accordingly, this nonvolatile storage device does not require a saving process and/or copy process, and thus, the cache releasing process can be performed in a short processing time. As a result, in this nonvolatile storage device, a process for altering an object area of the cache provided on the nonvolatile memory can be performed efficiently, and a preparation time for content recording can be reduced.

The wordings to "preferentially release from the cache object" imply to release from those which satisfy the conditions.

The third aspect is a first or second aspect in which the cache releasing section performs a cache releasing process, which is a process for releasing the logical address from the cache object at a timing not in synchronization with a timing it receives cache releasing from outside.

In this way, in this nonvolatile storage device, the cache releasing process can be performed in a spare time (a process is not performed frequently), for example.

The fourth aspect is a third aspect in which the cache releasing section performs the cache releasing process as a part of an initializing process of the memory controller performed when or after it receives the instruction of cache releasing in case of receiving the instruction of cache releasing from outside.

The fifth aspect is a third aspect in which the cache releasing section starts the cache releasing process based on the instruction of cache releasing received from outside while it is waiting for a command from outside.

The sixth aspect is a first or second aspect further including a cache information outputting section configured to output information regarding a time period required for releasing a logical address which is a cache object.

In this way, an access device connected to this nonvolatile storage device can obtain information regarding a time period required for releasing a logical address which is a cache object. Thus, the access device can easily designate a logical address to be an object of the cache releasing process.

The seventh aspect is a sixth aspect in which the cache information outputting section outputs information regarding logical addresses which are cache objects and can be released together in a predetermined period of time.

In this way, an access device connected to this nonvolatile storage device can obtain information regarding logical addresses which are cache objects and can be released together in a predetermined period of time. Thus, the access device can easily designate a logical address to be an object of the cache releasing process.

The eighth aspect is a sixth aspect in which the cache information outputting section compares data of a cache block corresponding to logical address A2 of a cache object and data on a data block corresponding to physical address P2 which corresponds to the logical address A2 and outputs a result of comparison.

In this way, an access device connected to this nonvolatile storage device can know whether the data of the cache block corresponding to logical address A2 of a cache object matches data on a data block corresponding to physical address P2 which corresponds to the logical address A2 or not. Thus, the access device can easily designate a logical address to be an object of the cache releasing process.

The ninth aspect is an access device for controlling data writing and/or data reading to and/or from a nonvolatile storage device including cache block(s) and data block(s), and includes a cache setting section and a cache information obtaining section.

The cache setting section is configured to set a logical address of data to be a cache object to a nonvolatile storage device. The cache information obtaining section is configured to obtain information, regarding a time period required for a nonvolatile storage device to release a logical address which is a cache object, from the nonvolatile storage device.

In this access device, the cache information obtaining section can obtain information regarding a time period required for a nonvolatile storage device to release a logical address which is a cache object. Thus, the logical address to be an object of the cache releasing process can be designated appropriately.

The tenth aspect is a ninth aspect in which the cache setting section refers to the information obtained by the cache information obtaining section and instructs the nonvolatile storage device to preferentially release logical addresses which can be released together in a predetermined period of time for releasing multiple logical addresses which are cache objects.

In this way, in this access device, logical addresses which can be released together in a predetermined period of time can preferentially become objects of the cache releasing process.

The eleventh aspect is a ninth aspect in which the cache setting section instructs the nonvolatile storage device to previously perform rearrangement of data in the nonvolatile storage device such that logical addresses which are cache objects become close to each other for registering multiple logical addresses which are cache objects.

The wordings "such that logical addresses become close" imply that the logical addresses are within one sector, one page cache, or one logical block, for example.

The twelfth aspect is a ninth aspect in which the cache setting section instructs the nonvolatile storage device to preferentially release a logical address which is a cache object and has a data matching flag, which indicates that there are same data in both the cache block and the data block, "ON" in the page cache management table managed by the nonvolatile storage device.

In this way, in this access device, logical addresses which are cache objects and have data matching flag "ON" can be designated preferentially to perform the cache releasing process.

The thirteenth aspect is a nonvolatile storage system including a nonvolatile storage device which is any one of first through eighth aspects and an access device which is any one of ninth through twelfth aspects.

Advantageous Effects

According to the present invention, a process for altering an object area of cache provided on a nonvolatile memory can be performed efficiently, and a preparation time for content recording can be reduced.

BRIEF DESCRIPTION OF DRAWINGS

FIG. 5 An illustrative diagram showing an exemplary structure of a page cache management table according to the first embodiment.

DESCRIPTION OF EMBODIMENTS

Hereinafter, embodiments of the present invention will be described with reference to the drawings.

[First Embodiment]

<1.1: Structure of Nonvolatile Storage System>

Figure 1:
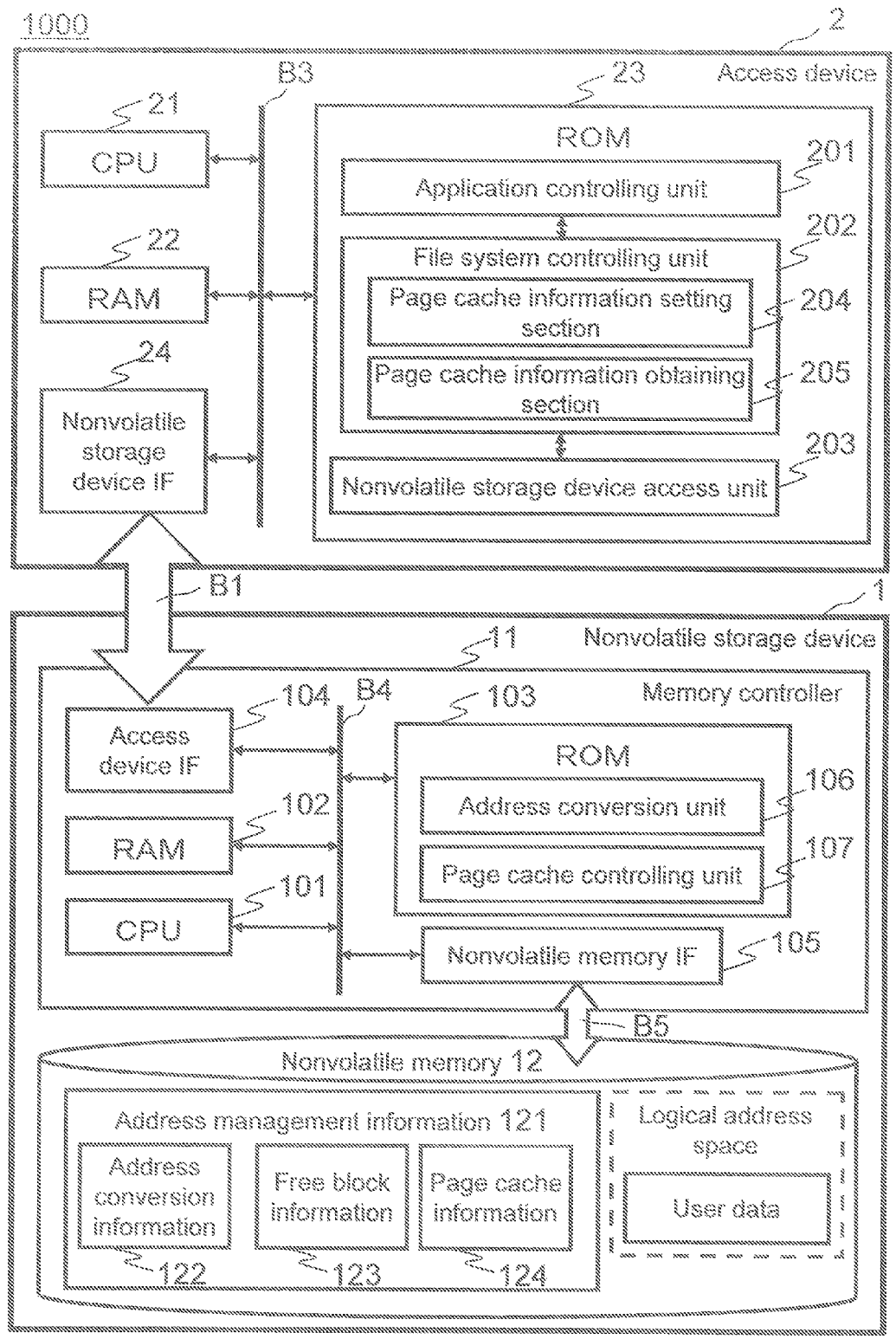
FIG. 1 A block diagram showing a nonvolatile storage system according to the first embodiment.

FIG. 1 is a schematic block diagram of a nonvolatile storage system 1000 according to the first embodiment.

As shown in FIG. 1, the nonvolatile storage system 1000 of the present embodiment includes a nonvolatile storage device 1 and an access device 2, and the nonvolatile storage device 1 and the access device 2 are coupled with a bus B1 and can interactively communicate via the bus B1. Alternatively, the nonvolatile storage device 1 may be attached to the access device 2.

The nonvolatile storage device 1 may be, for example, a semiconductor memory card. The access device 2 may be, for example, a video camera which records video content on the semiconductor memory cards.

(1.1.1: Structure of Access Device)

As shown in FIG. 1, the access device 2 includes a CPU 21, a RAM 22, a ROM 23, a nonvolatile storage device interface (nonvolatile storage device IF) 24 and a bus B3. The functional units of the access device 2 are connected to each other via the bus B3 as shown in FIG. 1. It is needless to further describe that all or a part of the functional units of the access device 2 may be connected directly in the access device 2, alternatively.

The ROM 23 stores a program for controlling the access device 2. The program uses the RAM 22 as a temporary storage area and runs on the CPU 21. The ROM 23 further includes an application controlling unit 201, a file system controlling unit 202, and a nonvolatile storage device access unit 203.

In the present embodiment, the application controlling unit 201, the file system controlling unit 202, and the nonvolatile storage device access unit 203 are assumed to be the ones implemented by software on the ROM 23. However, all or a part of the application controlling unit 201, the file system controlling unit 202, and the nonvolatile storage device access unit 203 may be implemented by hardware.

The application controlling unit 201 controls entire access device 2, such as generating data, controlling power supply, and so on.

The file system controlling unit 202 controls so as to manage data as files with a file system such as a FAT file system or the like. The file system controlling unit 202 includes a page cache information setting section 204 and a page cache information obtaining section 205.

The page cache information obtaining section 205 obtains information regarding page cache from the nonvolatile storage device 1 and notifies the page cache information setting section 204 of the obtained information. The page cache information obtaining section 205 is one of characteristic features of the present invention.

The page cache information setting section 204 is a controlling section for controlling access to page cache. It is similar to the conventional technique in providing the page cache information setting section 204, but the page cache information setting section 204 of the present invention performs more efficient control by further obtaining the information regarding page cache which is notified from the page cache information obtaining section 205. This is a characteristic feature of the present invention which is different from the conventional technique. The page cache information setting section 204 also notifies the nonvolatile storage device 1 of the information which has to be set as page cache information 124 of a nonvolatile memory 12. The page cache information setting section 204 further generates the information which has to be set as the page cache information 124 based on the information regarding page cache obtained from the nonvolatile storage device 1 and notifies the nonvolatile storage device 1.

The nonvolatile storage device access unit 203 controls a command issuing process for having the nonvolatile storage device 1 perform a certain process and/or a data send/receiving process with the nonvolatile storage device 1 via the nonvolatile storage device interface 24 and the bus B1. For example, for performing a data writing process to the nonvolatile storage device 1, the nonvolatile storage device access unit 203 receives (obtains) data size and data address from the file system controlling unit 202 with data. For performing a process to record data of a designated size on a designated position (a position corresponding to the designated address) in a storage area of the nonvolatile storage device 1 (data writing process), the nonvolatile storage device access unit 203 generates a data writing command issued to the nonvolatile storage device 1, and controls such that the generated data writing command is sent to the nonvolatile storage device 1 by the nonvolatile storage device interface 24. Further, the nonvolatile storage device access unit 203 controls such that the data to be written into the nonvolatile storage device 1 is sent to the nonvolatile storage device 1 by the nonvolatile storage device interface 24.

The nonvolatile storage device interface 24 is a connecting unit for the nonvolatile storage device 1 and the access device 2. The nonvolatile storage device interface 24 sends/receives control signals and data to/from the nonvolatile storage device 1 via the bus B1.

(1.1.2: Structure of Nonvolatile Storage Device)

As shown in FIG. 1, the nonvolatile storage device 1 includes a memory controller 11 and the nonvolatile memory 12. The memory controller 11 and the nonvolatile memory 12 are connected via a bus B5.

<<Memory Controller 11>>

First, the structure of the memory controller 11 is described.

The memory controller 11 is a module which controls the entire nonvolatile memory 12, and is formed as an LSI including a CPU and the like, for example. The nonvolatile memory 12 is formed of one or more NAND type flash memory, for example.

As shown in FIG. 1, the memory controller 11 includes a CPU 101, a RAM 102, a ROM 103, an access device interface (access device IF) 104, a nonvolatile memory interface (nonvolatile memory IF) 105 and a bus B4. The functional units of the memory controller 11 are connected to each other via the bus B4 as shown in FIG. 1. It is needless to further describe that all or a part of the functional units of the memory controller 11 may be connected directly in the memory controller 11, alternatively.

The access device interface 104 is a connecting unit for the nonvolatile storage device 1 and the access device 2. Similarly to the nonvolatile storage device interface 24, the access device interface 104 sends/receives control signals and data to/from the access device 2.

The nonvolatile memory interface 105 is a connecting unit for the memory controller 11 and the nonvolatile memory 12. The nonvolatile memory interface 105 controls sending/receiving commands and data to/from the nonvolatile memory 12.

The ROM 103 stores a program for controlling the nonvolatile storage device 1. The program uses the RAM 102 as a temporary storage area and runs on the CPU 101. The ROM 103 includes an address conversion controlling unit 106 and a page cache controlling unit 107.

In the present embodiment, the address conversion controlling unit 106 and a page cache controlling unit 107 are assumed to be the ones implemented by software on the ROM 103. However, all or a part of the address conversion controlling unit 106 and the page cache controlling unit 107 may be implemented by hardware.

The address conversion controlling unit 106 is a controlling unit for controlling correspondence between physical addresses on the nonvolatile memory 12 and logical addresses in a logical address space provided by the nonvolatile storage device 1 as an address space which can be accessed from the access device 2. The address conversion controlling unit 106 is a controlling unit similar to an address conversion controlling unit in a conventional nonvolatile storage device. The address conversion controlling unit 106 performs a conversion process between logical addresses and physical addresses with a logical address/physical address conversion table configured on the RAM 102, for example.

Figure 2:
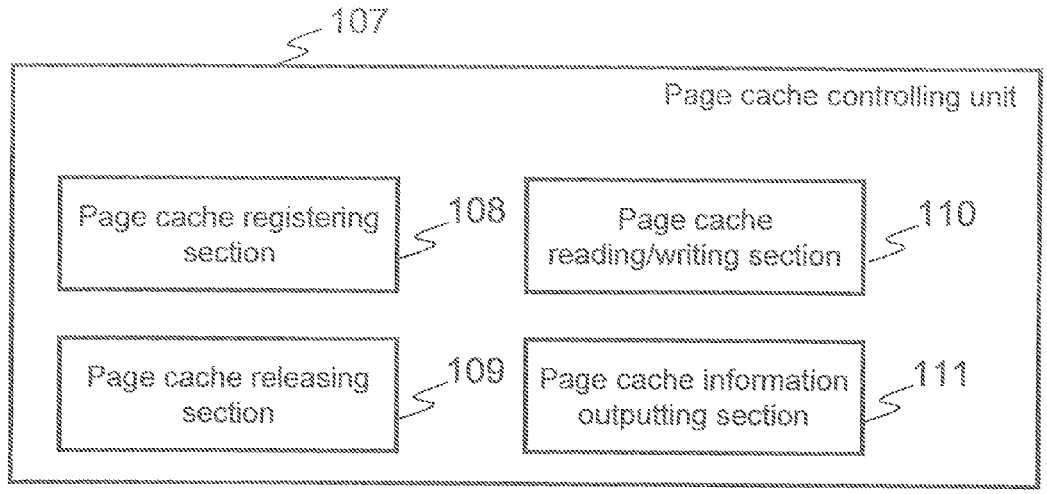
FIG. 2 A block diagram showing a structure of a page cache controlling unit 107 according to the first embodiment.

The page cache controlling unit 107 is a controlling unit for controlling page cache. It is similar to the conventional technique in providing the page cache controlling unit 107, but the page cache controlling unit 107 of the present invention further includes a page cache registering section 108, a page cache releasing section 109, a page cache reading/writing section 110, and a page cache information outputting section 111 as shown in FIG. 2. This is a point where the present invention is different from the conventional technique. The page cache controlling unit 107 also outputs information regarding page cache to the access device 2.

The page cache registering section 108 performs a process for registering a logical address designated upon a request from the page cache information setting section 204 of the access device 2 as an object of a page cache. The number of the logical addresses which can be registered by the page cache registering section 108 is a plural, and the value (the number of the logical addresses which can be registered) may be a value common to all the nonvolatile storage devices 1, or may be different for each of nonvolatile storage devices 1 to be connected to the access device 2.

The page cache releasing section 109 performs a process of canceling (releasing) the logical address, which is designated to be canceled its registration, from an object of page cache. Such a logical address is one of the logical addresses registered by the page cache registering section 108, and is designated to be canceled by a request from the page cache information setting section 204 of the access device 2

The page cache releasing section 109 has following two characteristics.

(1) The page cache releasing section 109 can receive a plurality of logical addresses which are object of registration canceling and perform registration canceling processes at a time.

(2) Also, the page cache releasing section 109 can select either a synchronous mode or an asynchronous mode regarding a timing to start the registration canceling process. In the synchronous mode, the registration canceling process is immediately started at a time the request from the access device 2 is received. On the other hand, in the asynchronous mode, the registration canceling process is only received upon the request from the access device 2, and an actual registration canceling process is performed at a different timing (for example, during an initializing process of the nonvolatile storage device 1, after a certain period of time has elapsed while waiting for a command from the access device 2, while a process of another command is being performed, or the like).

The page cache reading/writing section 110 performs a process of writing data into a logical address which is an object of page cache and/or a process of reading data from a logical address which is an object of page cache based on a request from the access device 2. The page cache reading/writing section 110 accesses the nonvolatile memory 12 via the nonvolatile memory interface 105 and the bus B5.

The page cache information outputting section 111 is a portion which outputs information on page cache to the access device 2 and does not exist in a conventional nonvolatile storage device. The information on page cache may be, for example:

(1) the number of logical addresses which can be registered to the page cache;

(2) the number of logical addresses which are registered to the page cache;

(3) information of the logical addresses which are registered to the page cache;

(4) information regarding a time period for canceling the logical addresses which are registered to the page cache from their registration to the page cache;

(5) information regarding combinations of the logical addresses which are registered to the page cache, which can be cancelled from their registration together in a predetermined period of time;

(6) information regarding objects of a process of removing data of the page cache when the logical addresses which are registered to the page cache are cancelled from their registration;

(7) information regarding the number of times of data updates of the logical addresses which are registered to the page cache;

(8) information regarding the order of registration of the logical addresses which are registered to the page cache;

(9) information regarding the order of the latest update of the logical addresses which are registered to the page cache;

(10) identifier information of the logical addresses which are registered to the page cache;

(11) size information of the page cache; and so on.

<<Nonvolatile Memory 12>>

Next, a structure of a nonvolatile memory 12 is described.

As shown in FIG. 1, the nonvolatile memory 12 has an area which stores user data and an area which stores address management information 121. The nonvolatile memory 12 stores the address management information 121 in the area different the area in which the user data is stored.

The address management information 121 is information used for address management of recording areas in the nonvolatile memory 12, and the information regarding the correspondence between the physical address and the logical address as mentioned above is one of such information, for example. In the nonvolatile memory 12, the user data is stored within a logical address space which can be accessed from the access device 2, while the address management information 121 is stored outside the logical address space (an area which cannot be accessed from the access device 2 with a logical address) such that the information cannot be accessed from the access device 2.

The address management information 121 includes address conversion information 122 for managing correspondence between physical addresses and logical addresses, free block information 123 for managing empty physical blocks, and the page cache information 124 for managing the page cache.

The address conversion information 122 and the free block information 123 are similar to information included in a conventional nonvolatile storage device 1.

The page cache information 124 is information for managing the page cache.

The nonvolatile storage device 1 according to the present embodiment stores the page cache information 124 in the nonvolatile memory 12.

The page cache information 124 is used by the page cache controlling unit 107 to perform a process of writing data of a small size by the page cache. Specifically, page cache controlling unit 107 in the nonvolatile storage device 1 uses the page cache information 124 to implement a process of writing data (information) of a small size to a specific physical block used like a cache (physical block for page cache). In other words, by combining the nonvolatile storage device 1 and the access device 2, a process of writing data of a small size is performed on the page cache, and the writing speed can be increased.

The information to be set as the page cache information 124 is generated based on the information regarding page cache which is obtained from the nonvolatile storage device 1 by the page cache information setting section 204 of the access device 2. The generated page cache information 124 is notified to the nonvolatile storage device 1. In the nonvolatile storage system 1000, by combining the nonvolatile storage device 1 and the access device 2 and using the page cache information 124 in such a way, the logical addresses which is objects of the page cache can be efficiently switched.

<<Physical Structure of Nonvolatile Memory 12>>

Figure 3:
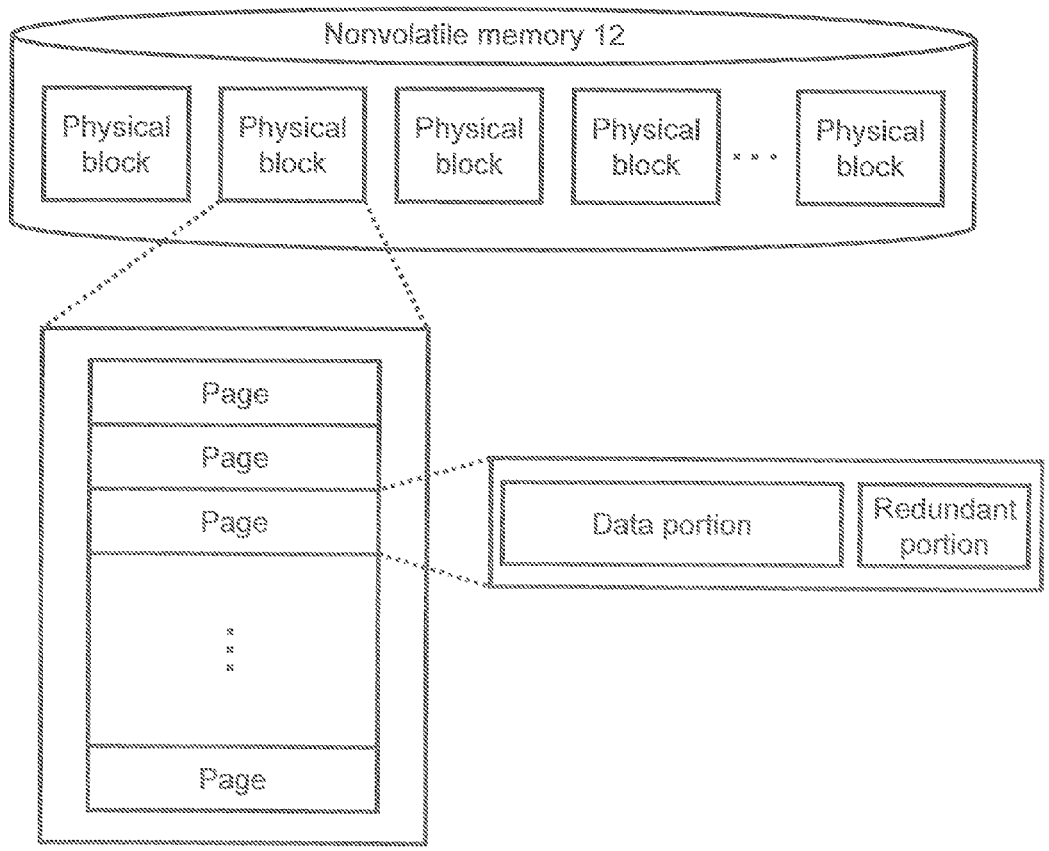
FIG. 3 An illustrative diagram showing an exemplary structure of a nonvolatile memory according to the first embodiment.

Next, with reference to FIG. 3, the physical structure of the nonvolatile memory 12 in the first embodiment of the present invention is described.

As the nonvolatile memory 12, a flash memory of NAND type may be used, for example. The nonvolatile memory 12 is formed of a plurality of physical blocks.

Physical blocks are units for deleting data. Before writing data, data have to be erased temporarily in this unit. A physical block is formed of a plurality of pages.

The pages are units for writing data. A page includes a data portion and a redundant portion.

A data portion is an area which can be accessed from the access device 2 as a logical address space, and is an area in which file data and the like are actually stored.

A redundant portion is an area in which the management information of the nonvolatile memory 12, ECC, which is an error correction code, or the like are stored, and is an area which cannot be accessed from the access device 2. The size of the data portion is, for example, 4 KB, and the size of the redundant portion is about 128 bytes.

The size of the physical block with respect to the data portion only is, for example, about 512 KB. Thus, the total capacity of the nonvolatile memory 12, which is formed of 2048 physical blocks of this size, is 1 gigabyte (GB).

<1.2: Operations of Nonvolatile Storage Device>

Hereinafter, operations of the nonvolatile storage system 1000 having a structure as described above are described separately for operations of the nonvolatile storage device and operations of the access device.

(1.2.1: Operations of Nonvolatile Storage Device)

First, operations of the nonvolatile storage device 1 are described.

(1.2.1.1: Initializing Process)

Figure 4:
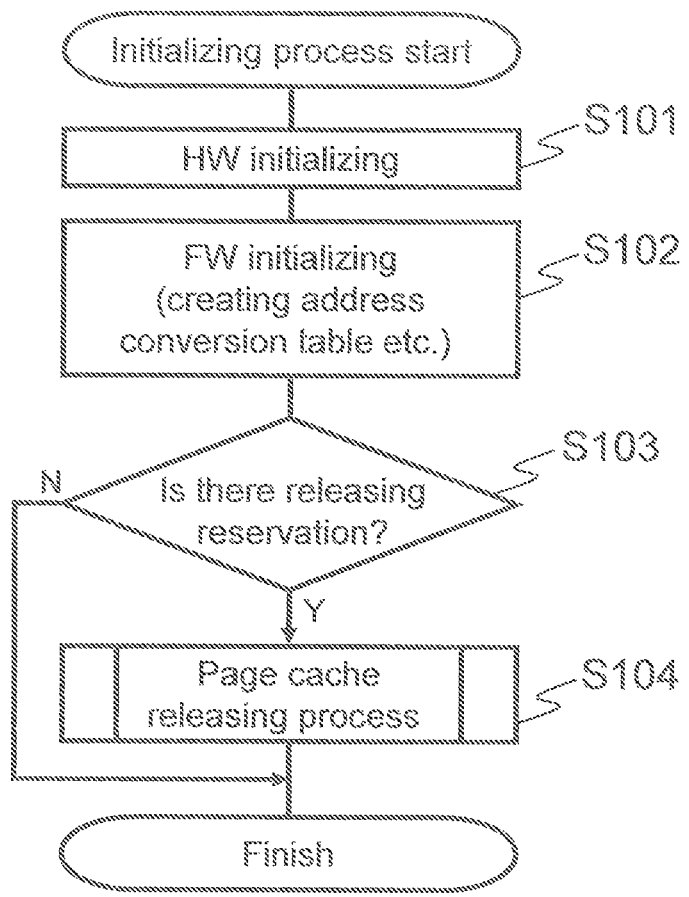
FIG. 4 A flow diagram showing an initializing process procedure of a nonvolatile storage device 1 according to the first embodiment.

FIG. 4 is a flow diagram showing an initializing process procedure of the nonvolatile storage device 1.

The nonvolatile storage device 1 is mounted to the nonvolatile storage device interface 24 of the access device 2, and, when the power is turned on, performs an initializing process of hardware (HW) which forms the nonvolatile storage device 1 (S101).

Then, the nonvolatile storage device 1 transfers firmware (FW), which is a program stored in the ROM 103 in the memory controller 11, to the CPU 101, and performs an initializing process by software (S102).

At this time, the address conversion controlling unit 106 reads out the address conversion information 122 and/or the free block information 123 from the nonvolatile memory 12 via the nonvolatile memory interface 105 and creates an address conversion table and/or a free block table on the RAM 102. These tables are created on the RAM 102 so that the information can be referred to without being reading out from the nonvolatile memory 12 and the speed of the process can be increased.

Similarly, the page cache controlling unit 107 reads out the page cache information 124 from the nonvolatile memory 12 via the nonvolatile memory interface 105, and creates a page cache management table of the RAM 102.

The page cache controlling unit 107 refers to releasing reservation flags (which will be later described) on the created page cache management table, and determines whether there is a releasing reservation (S103). The page cache controlling unit 107 performs a page cache releasing operation which will be later described only when there is a releasing reservation (S104), and the process is finished.

<<Page Cache Management Table>>

FIG. 5 shows an exemplary structure of the page cache management table.

In the example of FIG. 5, the page cache management table can store information regarding eight page caches having page cache number "0" through "7". The information regarding the page cache associated to each of the page cache numbers is referred to as "entry".

As shown in FIG. 5, each of the entries can store information such as use flag, logical block number, logical page number, data matching flag, releasing reservation flag, update counter and the like.

The use flag indicates the state of the entry whether it is being used (ON) or is empty (OFF). When the use flag indicates of being used (ON), the data of the logical block number of this entry and the following numbers are treated as effective values. On the other hand, when the use flag indicates of being empty (OFF), this entry is treated as an invalid value (N/A). In other words, when the use flag indicates of being empty (OFF), the entry is not being used as a page cache.

The logical block number and the logical page number indicate logical addresses registered to the page cache. In the present embodiment, the logical addresses are registered in the units of pages. However, it is not limited to such an example, and the logical pages may be registered in the units of sectors (the units of 512 bytes), or may be registered in the units of multiple pages, for example.

In the present embodiment, "a logical address is registered as a page cache" means that there is an entry having the use flag ON, and a logical block number and a logical page number match to the logical address in a page cache management table. Further, "to cancel registration of a logical address from a page cache" means that the entry as described above is removed from the page cache table by turning the use flag OFF, or the like.

The data matching flag indicates whether the data stored as the page cache and the data stored in a place corresponding to the logical address of the page cache in the conventional address management match (ON) or do not match (OFF). For example, when data of logical block number "0x0053" and logical page number "0x00" is associated to data of physical block number "0x0040" and physical page number "0x00" by the conventional logical address/physical address conversion, data of page cache number "1" in FIG. 5 which has the data matching flag ON, i.e., data of the logical block number "0x0053" and logical page number "0x00" is in both a physical block for page cache (physical block number "0x0018") and a normal physical block (physical block number "0x0040") and the data held in the physical block for page cache and the data held in the normal physical block (physical block number "0x0040") (data of physical block number "0x0040" and physical page number "0x00") match.

The releasing reservation flag indicates whether there is a reservation for releasing the entry (ON) or not (OFF) by the page cache releasing process, which will be later described.

The update counter indicates the number of times of writing as page cache to the logical address registered to the entry after the entry has been registered.

Further, the page cache management table stores information regarding the physical address to which the data of the logical address registered to the page cache is written when it is written as page cache (physical block number (in case of FIG. 5, "0x0018"), page number of next writing (in case of FIG. 5, "0x40") and the like). The physical block for page cache writing shown herein is referred to as "cache block".

(1.2.1.2: Command Waiting Process)

Figure 6:
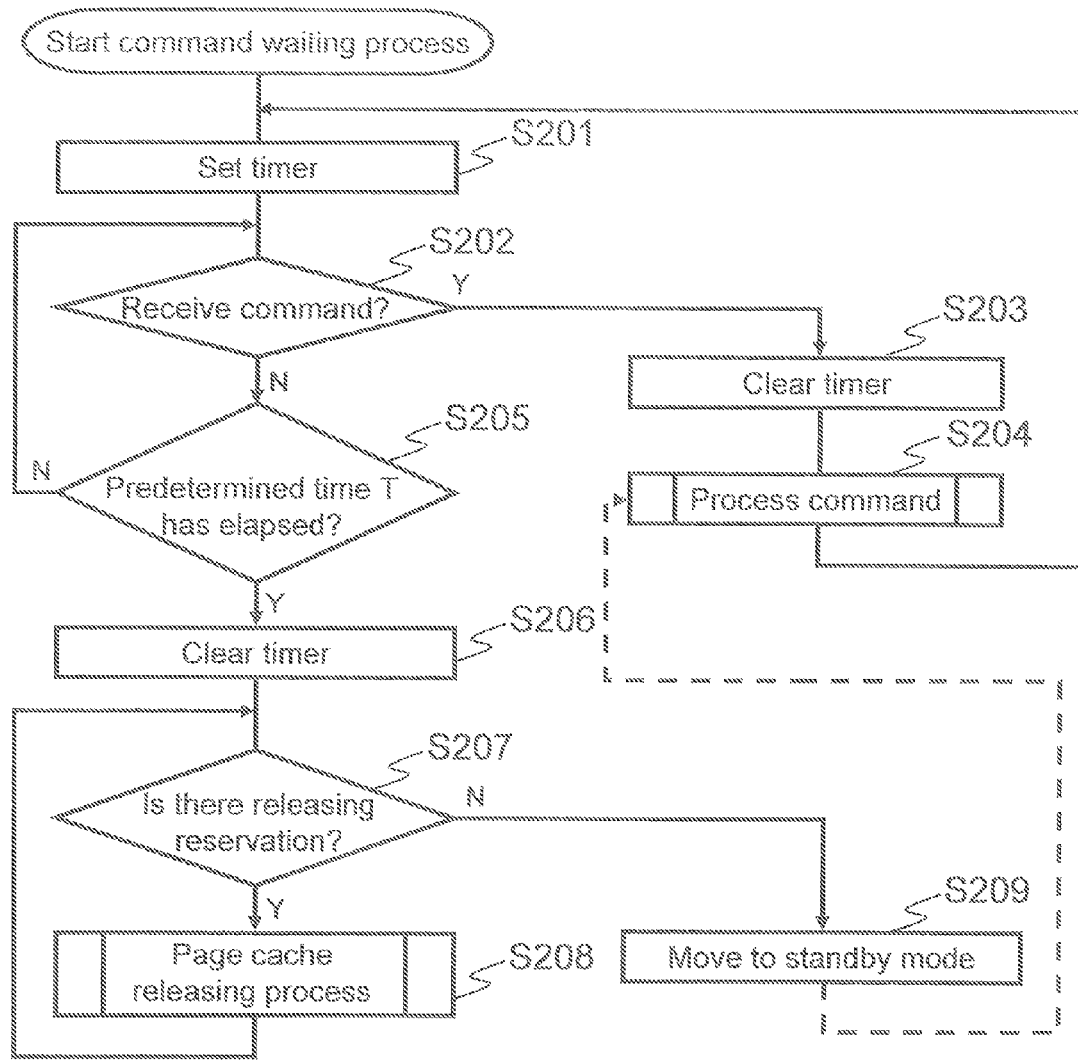
FIG. 6 A flow diagram showing a command waiting process procedure of the nonvolatile storage device 1 according to the first embodiment.

FIG. 6 is a flow diagram showing a command waiting process procedure of the nonvolatile storage device 1.

The nonvolatile storage device 1 enters a waiting state for receiving a command from the access device 2 after performing the above-described initializing process and performing a process in response to a command received from the access device 2.

(S201 through S206):

First, the memory controller 11 starts the operation of an incorporated timer (not shown) (S201), and then, monitors reception of a command from the access device 2 (S202). The memory controller 11 stops the timer upon reception of a command and resets the timer (for example, by clearing a timer counter value) (S203), and performs a process of the received command (S204).

A "process of a received command" refers to, for example, a data writing process, a data reading process, a page cache registering process, a page cache releasing process, and a page cache information outputting process.

While it is waiting for reception of a command, the timer is used to monitor whether a predetermined time period T has elapsed or not (S205). When the predetermined time period T has elapsed, the timer is stopped and is reset (the timer counter value is cleared) (S206).

(S207 Through S209):

Thereafter, referring to the use flag and the releasing reservation flag (described later) of the page cache management table created on the RAM 102, it is determined whether there is a releasing reservation or not (S207).

Only when there is a releasing reservation, a page cache releasing process which will be later described is repeated (S208). When there is no releasing reservation, the memory controller 11 moves to a standby mode for suppressing power consumption (S209). In the standby mode, a part of power supply to the memory controller 11 is stopped, and/or power supply to the nonvolatile memory 12 is stopped, but power supply to the part which receives a command from the access device 2 is not stopped. When a command is received after moving to the standby mode, the procedure moves to the process of S204.

When, a command from the access device 2 is received during the page cache releasing process of S208, it is desirable to stop the page cache releasing process, and preferentially performs the command receiving process (S204). In other words, as described later, since the page cache releasing process accompanies a data copy process in the nonvolatile memory 12 and requires a relatively long time period as the processing time. In order to prevent the response to the command from the access device 2 from deteriorating, it is desirable to stop the page cache releasing process and preferentially perform the command receiving process (S204) in the above case.

Further, the memory controller 11 may increment or reduce the value of the predetermined time period T depending upon whether the page cache releasing process of S208 is stopped or not. In this way, in a period during which commands form the access device 2 are frequently issued in the nonvolatile storage system 1000, performing the page cache releasing process can be withheld to prevent the page cache releasing process from being stopped continuously.

(1.2.1.3: Data Writing Process)

Figure 7:
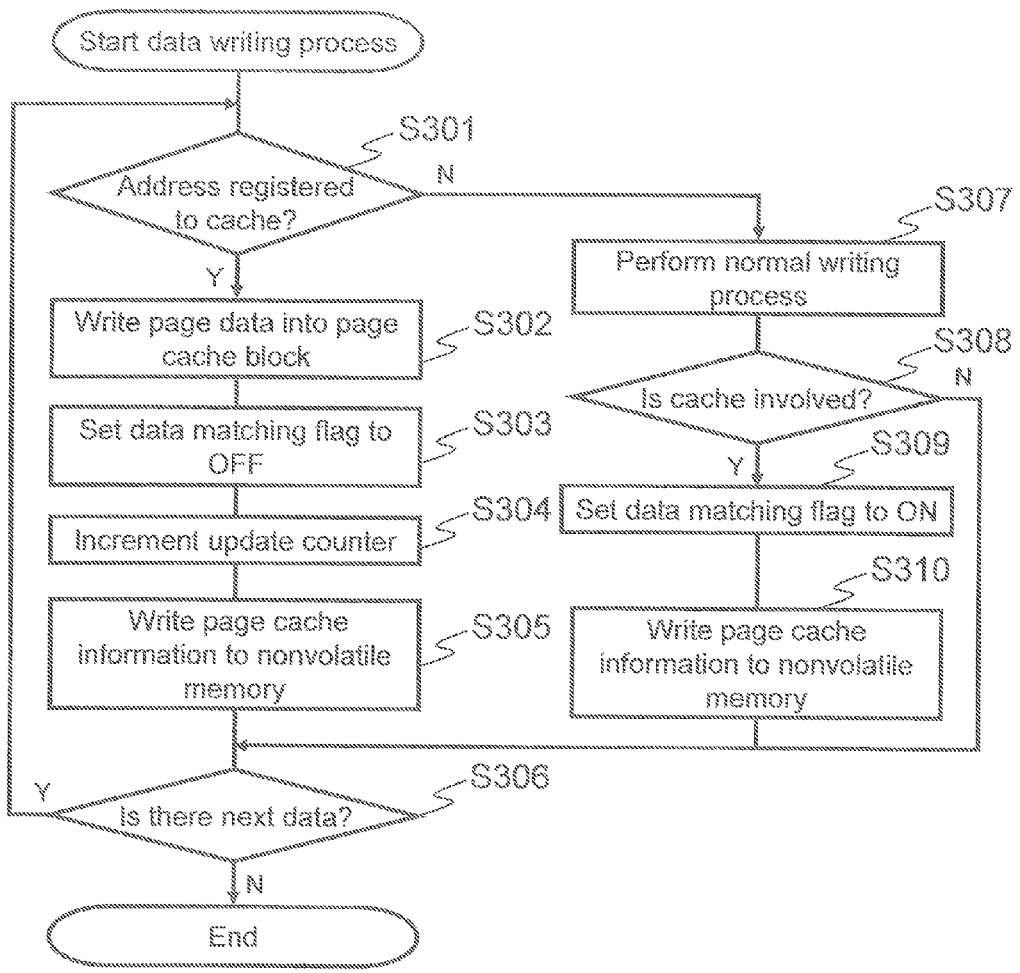
FIG. 7 A flow diagram showing a data writing process procedure of the nonvolatile storage device 1 according to the first embodiment.

FIG. 7 is a flow diagram showing a data writing process procedure of the nonvolatile storage device 1.

(S301, S302):

When the nonvolatile storage device 1 receives a command instructing a data writing process from the access device 2, the page cache controlling unit 107 refers to the page cache management table, and determines whether the logical address designated by the access device 2 to write is registered to the page cache management table as an object area of the page cache (S301).

When the logical address to which data is written is registered to the page cache management table, the page cache reading/writing section 110 writes writing data received from the access device 2 to the cache block of the nonvolatile memory 12 via the nonvolatile memory interface 105 (S302). The physical address to which the data is written is judged by referring the page cache management table (physical block number, next page to write).

<Exemplary State of Writing to Cache Block>>

Figure 8:
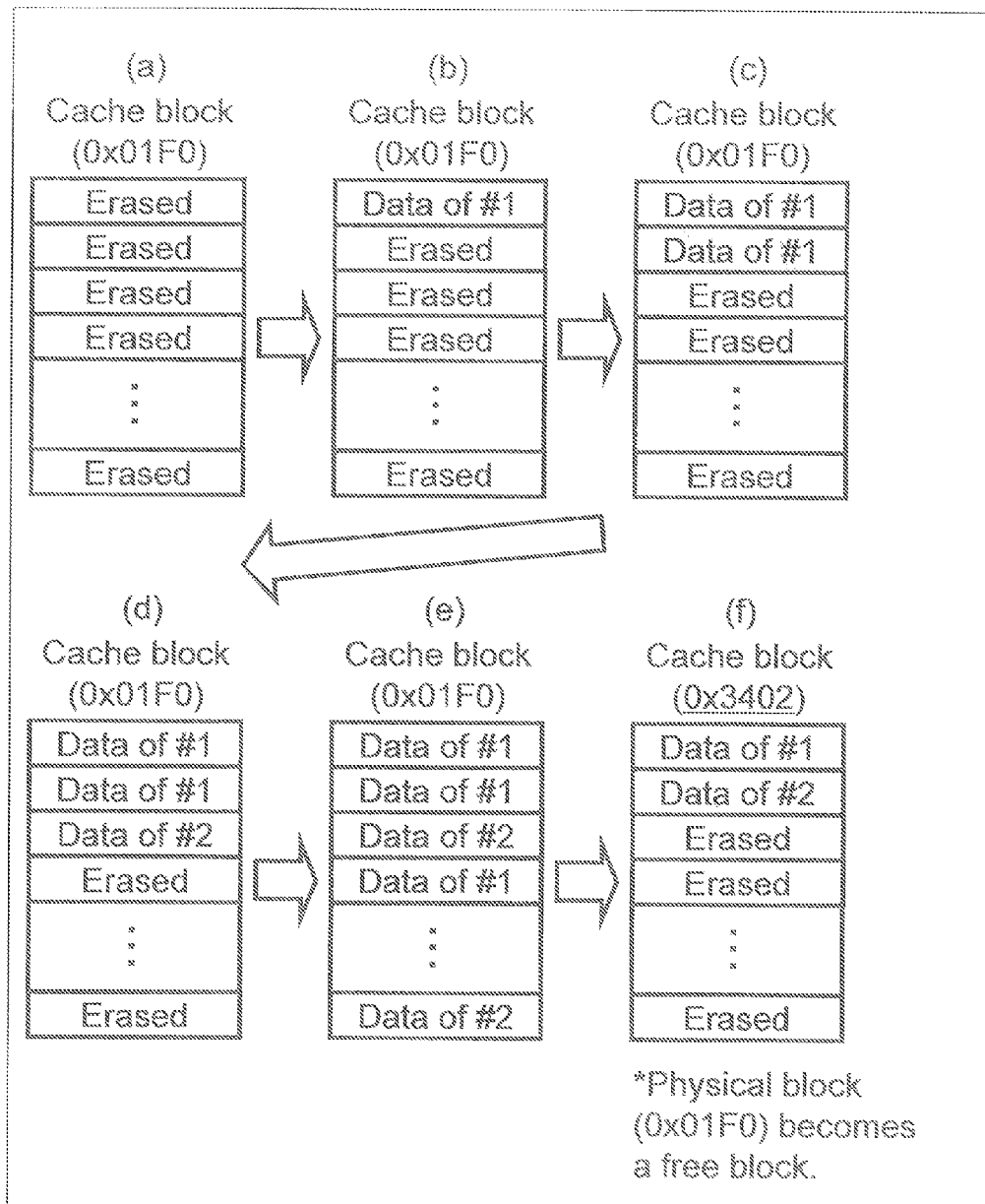
FIG. 8 An illustrative diagram showing an example of a change in a writing state of a cache block according to the first embodiment.

FIG. 8 shows an exemplary state of writing to a cache block. At a first writing to a cache block, the cache block (physical block number: 0x01F0) is in a state of being erased as shown in FIG. 8A. As a next page to write in the page cache management table, a numeric value "1" which indicates a first page is stored. When writing of data of page cache number "1" (page cache number "1" is sometime denoted as "#1") (data of #1) occurs, the data (data of #1) is stored in the first page of the cache block (physical block number: 0x01F0) as shown in FIG. 8B. The next page to write in the page cache management table is updated to a numerical value "2" which indicates the page next to the first page.

When writing of data of page cache number #1 occurs in the state as shown in FIG. 8B, the data (data of #1) is stored in the second page of the cache block (physical block number: 0x01F0) as shown in FIG. 8C. Then, the next page to write in the page cache management table is updated to "3".

As shown in FIG. 8C, when multiple pieces of data of the same page cache number (i.e., of the same logical address) are stored in the cache block, the data written last is handled as an effective one and the rest of the data are handled as invalid ones. Specifically, in the case of FIG. 8C, the data on the first page of physical block number "0x01F0" is invalid and the data on the second page of physical block number "0x01F0" is handled as valid.

Similarly, when writing of data of page cache number #2 occurs in the state as shown in FIG. 8C, the state becomes the one as shown in FIG. 8D, and the next page to write in the page cache management table is incremented.

When all the pages are occupied with writing as shown in FIG. 8E as a result of repeating writing to the cache block, the page cache controlling unit 107 refers to the free block information 123 to obtain and erase a free block (in case of FIG. 8, physical block number: 0x3402 denotes a free block). Then, the page cache controlling unit 107 copies valid data of the cache block (in case of FIG. 8E, the physical block of physical block number "0x01F0") to the free block (physical block of physical block number "0x3402") from the head. Thereafter, the free block (physical block of physical block number "0x3402") is registered as a new cache block and the original cache block (physical block number: 0x01F0) is reused as a free block. Accordingly, the state becomes the one as shown in FIG. 8F, and the next page to write in the page cache management table is updated to "3".

The description is returned to the data writing process.

(S303 Through S305):

In the page cache management table, the entry of the logical address to which data is written at S302 has the data matching flag set OFF (S303), and the update counter is incremented (S304). The information of the updated page cache management table is written into the nonvolatile memory 12 as the page cache information 124 (S305).

As a storing method in writing into the cache block, the data matching flag and/or value of the update counter may be stored in the redundant portion of the page. At writing at S302, as the data from the access device 2 is stored in the data portion of the page, the data matching flag (which has a value "OFF") and the update counter (which has a counter value after incrementing) may be stored in the redundant portion of the same page. In this way, an amount of process in writing into the nonvolatile memory 12 which is required in the process from S302 to S305 can be reduced.

(S306):

After the process at S305, the process is returned to S301 if writing is continued for the next logical address, and if it is not, the data writing process is finished (S306).

(S307):

In determining at S301, if the logical address designated by the access device 2 to write is not registered as an object are of the page cache, a writing process similar to that in a conventional nonvolatile storage device is performed (S307).

In a conventional writing process, the address conversion information 122 and/or free block information 123 stored in the nonvolatile memory 12, and the address conversion table and the free block table on the RAM 102 created therefrom are used.

However, the present embodiment has following features in the process at S307.

When the "saving process" is required during the process at S307, the memory controller 11 determines whether an address range of the data of the original of the copy in the saving process covers the logical address of the using entry in the page cache management table. When it covers the logical address of the using entry in the page cache management table, the saving process is performed having the data of the logical address, which is the data of the page cache (data stored in the cache block), as the data of the original of copy.

In such a say, the data being page cached (data stored in the cache block) matches the data of a save target (copy target) in the saving process.

Figure 9:
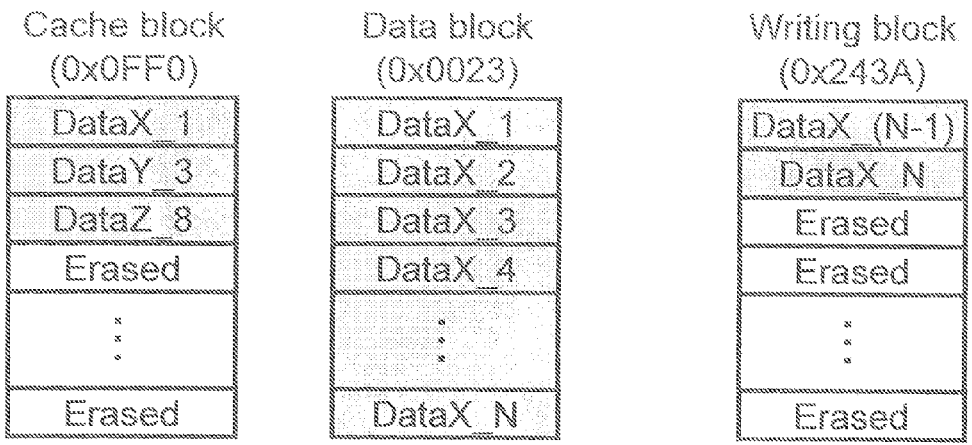
FIG. 9 An illustrative diagram showing an example of handling data of a cache block in a saving process according to the first embodiment.
Figure 9:
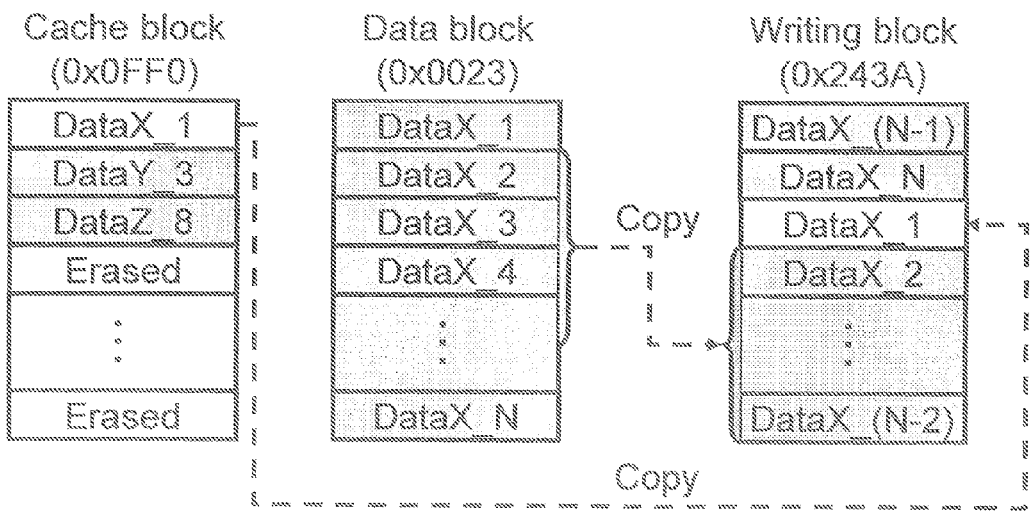

FIG. 9 shows an exemplary state of writing into physical blocks before and after the saving process at S307.

FIG. 9A shows a state before the saving process.

The cache block (physical block number: 0x0FF0) stores three pieces of valid data of page cache. The (logical block number, logical page number) of the page cache are, respectively, (X, 1), (Y, 3), and (Z, 8). In FIG. 9, data of (A, B) (data of logical block number "A" and logical page number "B") is denoted as "data A_B".

The data block (physical block number: 0x0023) is a block of an original of copy in the saving process, and data of all pages (1 through N) of logical block number X ("data X_1" through "data X_N") are stored.

The writing block (physical block number: 0x243A) is a block of a copied site in the saving process, and data of two pages, i.e., page (N-1) and page N of logical block number X ("data X_(N-1)" and "data X_N").

FIG. 9B shows a state after the saving process.

The states of the cache block and the data block are same as in FIG. 9A.

To the writing block (physical block number "0x243A"), data from page 1 to page (N-2) of logical block number X ("data X_1" through "data X_(N-2)" are copied. Since data of page 1 ("data X_1") exists in both the cache block (physical block number "0x0FF0") and the data block (physical block number "0x0023"), data of the cache block (physical block number "0x0FF0") is preferentially copied. The other data do not exist in the cache block, and thus, they are copied from the data block (physical block number "0x0023").

After the saving process, the writing block (physical block number "0x243A") is registered to the address conversion table on the RAM 102 and address conversion information 122 of the nonvolatile memory 12 as a new data block of the logical block number X. The original data block (physical block number: 0x0023) is registered as a free block to the free block table on the RAM 102 and/or the free block information 123 of the nonvolatile memory 12, and is reused.

The description returns to the data writing process again.

(S308 Through S310)

When the Saving Process Occurs in the Process at S307, it is Determined Whether the saving process is performed with the information of the page cache (data stored in the cache block) being the data of original of copy (S308).

If the saving process is performed with the information of the page cache (data stored in the cache block) being the data of original of copy, the data matching flag of the corresponding entry on the page cache management table is set to "ON" (S309), and the page cache information 124 on the nonvolatile memory 12 is reflected (S310). Specifically, if the saving process is performed with the information of the page cache (data stored in the cache block) being the data of original of copy, the data stored as page cache (the data stored in the cache block) and the data stored in the place corresponding to the logical address of the page cache in the conventional address management match in the state after the saving process, and thus, the data matching flag of the corresponding entry is set to "ON". In the case of FIG. 9B, data of the first page of the cache block (physical block number "0x0FF0") ("data X_1") and the data of the third page of the writing block (normal physical block) (physical block number "0x243A") ("data X_1") match, and thus, the data matching flag is set to "ON" in the entry on the page cache management table, which corresponds to data X_1.

(S306):

After the process at S310, if writing is continued for the next logical address, the process returns to S301, and if it is not, the data writing process is finished (S306).

(1.2.1.4: Data Reading Process)

Figure 10:
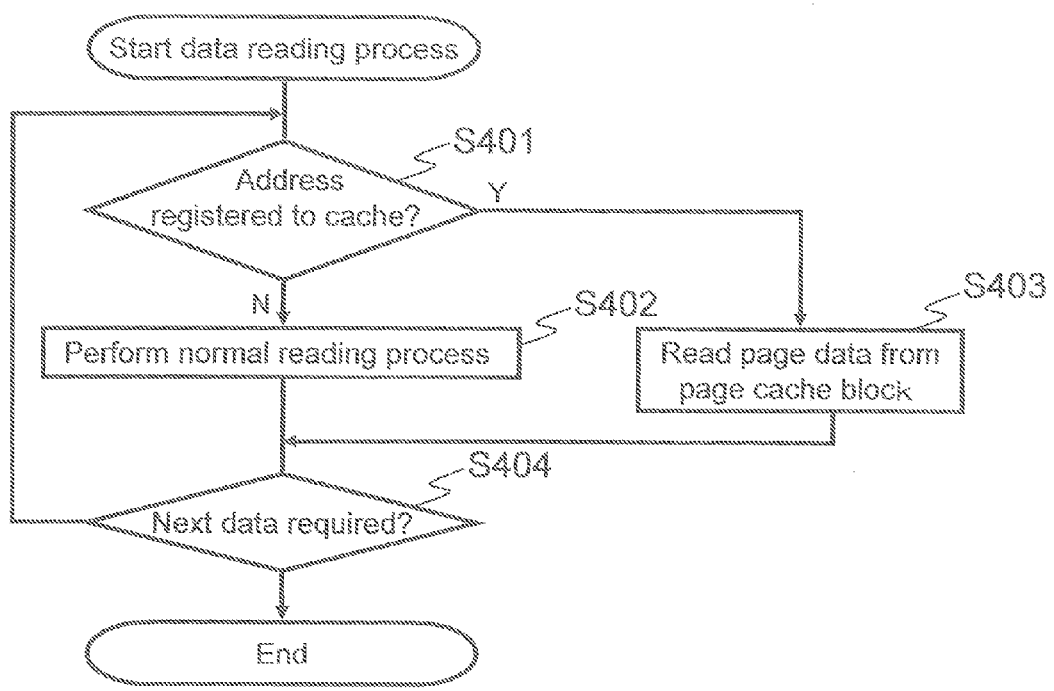
FIG. 10 A flow diagram showing a data reading process procedure of the nonvolatile storage device 1 according to the first embodiment.

FIG. 10 is a flow diagram showing a data reading process procedure of the nonvolatile storage device 1.

(S401):

When the nonvolatile storage device 1 receives a command instructing data reading from the access device 2, the page cache controlling unit 107 refers to the page cache management table and determines whether the logical address designated by the access device 2 to read out data is registered as an object area of the page cache or not (S401).

(S403):

If the logical address from which data is read out is registered as an object area of the page cache, the page cache reading/writing section 110 reads out data from the cache block of the nonvolatile memory 12 via the nonvolatile memory interface 105, and sends the read out data to the access device 2 (S403).

(S402):

On the other hand, if the logical address from which data is read out is not registered as an object area of the page cache, a reading process similar to that in the conventional nonvolatile storage device is performed (S402). In the conventional reading process, the address conversion information 122 stored in the nonvolatile memory 12 and the address conversion table on the RAM 102 which is created therefrom are used.

(S404):

After the process at S402 and S403, if reading is continued for the next logical address, the process returns to S401, and if it is not, the data reading process is finished (S404).

(1.2.1.5: Page Cache Registering Process)

Figure 11:
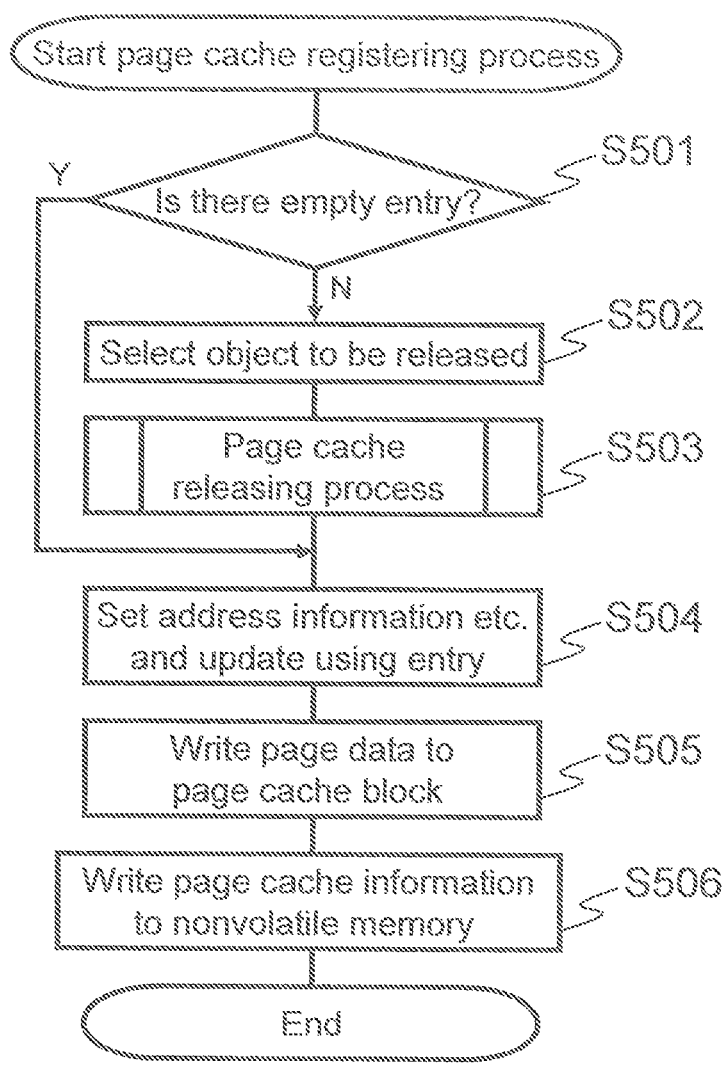
FIG. 11 A flow diagram showing a page cache registering process procedure of the nonvolatile storage device 1 according to the first embodiment.

FIG. 11 is a flow diagram showing a page cache registering process procedure of the nonvolatile storage device 1.

The access device 2 issues a command to instructs page cache registration (hereinafter, referred to as "page cache registration command") to the nonvolatile storage device 1, and the page cache registration command includes at least the information on the logical address to be registered as being included within the objects of the page cache. Further, in the present embodiment, writing data to the logical address designated by the page cache registration command is transferred with the page cache registration command.

(S501):

When the nonvolatile storage device 1 receives a command instructing page cache registration (page cache registration command) from the access device 2, the page cache registering section 108 of the page cache controlling unit 107 refers to the page cache management table and determines whether there is an empty entry for registering the logical address designated by the access device 2 or not (S501).

(S502, S503):

If there is no empty entry in the page cache management table, a releasing object is selected from the entries being used, which are registered to the cache management table (S502), and the page cache releasing process (S503) which will be later described is performed to secure an empty entry.

At S502, the entries having the data matching flag "ON" may be selected preferentially. In this way, a time period required for the page cache releasing process (S503) which will be later described can be reduced.

At S502, the entries having the releasing reservation flag "ON" may be selected preferentially. In this way, the entries explicitly instructed by the access device 2 to release registration can be released from registration. Thus, risk of having the registering process again as a result of releasing the entry which is not intended by the access device 2 can be mitigated.

(S504, S505):

Next, the logical address received from the access device 2 is set to the secured empty entry with being converted into the logical block number and the logical page number. Also, the secured empty entry is set with the initial value. Specifically, the data matching flag is set "OFF", the releasing reservation flag is set "OFF", and the update counter is set "0", respectively. The use flag is set "ON", and the empty entry is changed to the use entry (S504).

Then, the writing data received with the page cache registration command is written into the cache block as page cache object data with a procedure similar to the process at S302 (S505).

(S506):

At last, the page cache controlling unit 107 performs writing into the nonvolatile memory 12 in order to reflect the updated page cache management table information in the page cache information 124 (S506).

In the present embodiment, writing data to a logical address designated by a command is transferred with the command. However, writing data to a logical address designated by a command may be transferred separately from the command. In such a case, it is desirable that the data of the logical address designated by the command does not change before and after the page cache registration process by the command.

In the case where only the logical address is transferred from the access device in the command instructing page cache registration and the writing data is not transferred, existing data of the logical address in the data block may be copied to the cache block to generate initial data of the page cache. As described with reference to FIG. 10, in the data reading process, the data of the data block is read out before the data page registration process of the logical address, and the data of the page cache is read out after the page cache registration process. Accordingly, the existing data of the data block is copied to the cache block so as to ensure that the data read out before and after the page cache registration process do not change.

Further, in the present embodiment, when there is no empty entry, the page cache releasing process is performed automatically. However, the present invention is not limited to this. For example, in the case where the access device 2 manages presence of an empty entry and there is no empty entry, a command which instructs a page cache releasing process may be issued from the access device 2 and response showing "error" may be returned to the access device 2 from the nonvolatile storage device 1 as long as the page cache releasing process (described later) is not performed.

(1.2.1.6: Page Cache Releasing Process)

Figure 12:
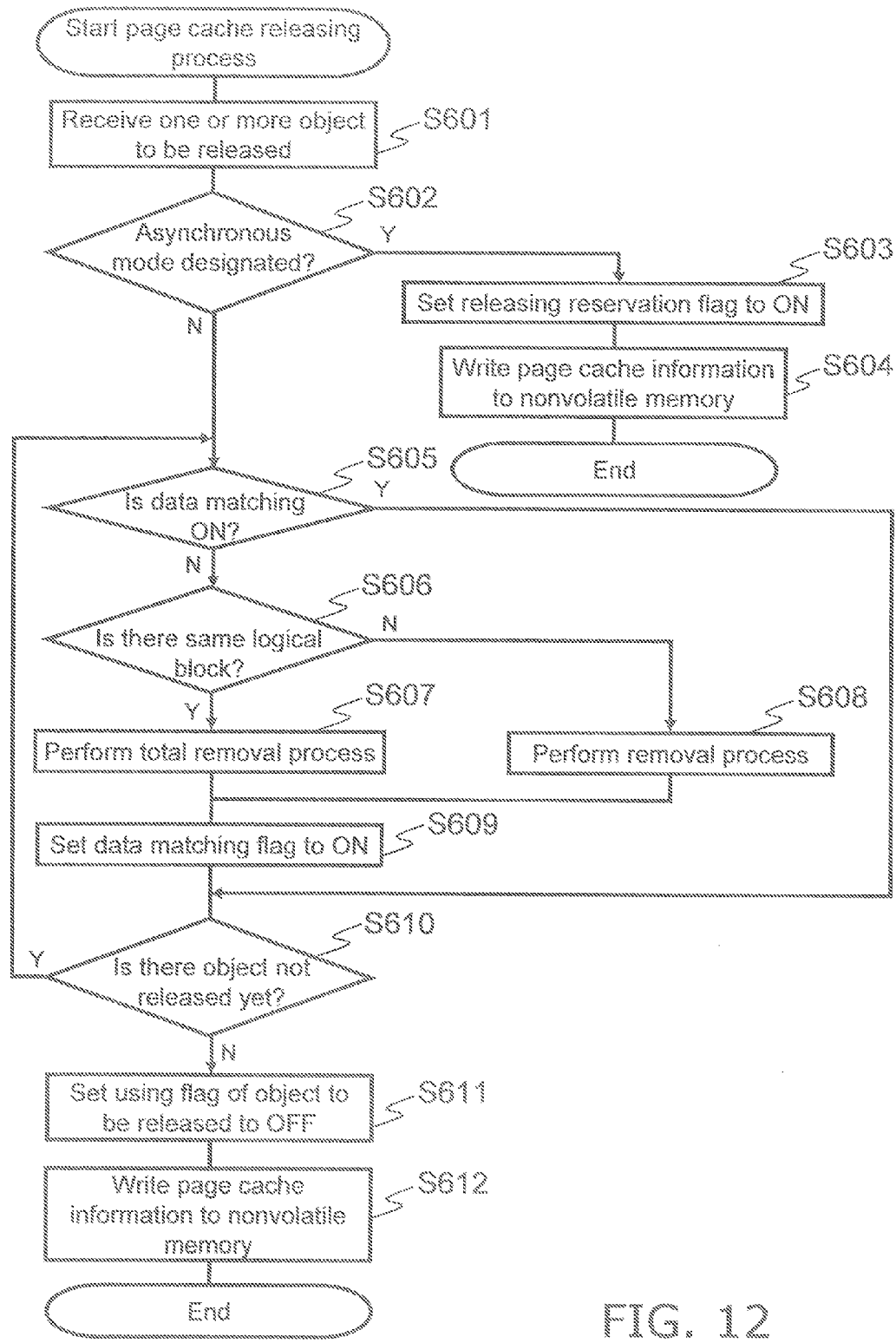
FIG. 12 A flow diagram showing a page cache releasing process procedure of the nonvolatile storage device 1 according to the first embodiment.

FIG. 12 is a flow diagram showing the page cache releasing process procedure of the nonvolatile storage device 1.

The access device 2 issues a command instructing page cache registration canceling (hereinafter, referred to as "page cache registration canceling command") to the nonvolatile storage device 1. The command includes information on at least one page cache number and information regarding a mode of the registration canceling process (synchronous mode/asynchronous mode).

(S601, S602):

When the nonvolatile storage device 1 receives a command instructing page cache registration canceling (page cache registration canceling command) from the access device 2 (S601), it refers to the information regarding a mode (synchronous mode/asynchronous mode) accompanied with the page cache registration canceling command (S602).

(S603, S604):

If the mode designated by the page cache registration canceling command is the asynchronous mode, the page cache releasing section 109 of the page cache controlling unit 107 refers to the page cache management table and set the releasing reservation flag(s) of the entry (or entries) of the page cache number(s) designated by the access device 2 to "ON" (S603). Then, the page cache controlling unit 107 performs writing into the nonvolatile memory 12 in order to reflect the updated page cache management table information in the page cache information 124 (S604).

(S605):

On the other hand, if the mode designated by the page cache registration canceling command is the synchronous mode, the page cache releasing section 109 of the page cache controlling unit 107 refers to the page cache management table to select one of the entries corresponding to the page cache numbers designated by the access device 2 and confirms the data matching flag of the selected entry (S605).

(S606 Through S609):

Only when the data matching flag is "OFF", the page cache releasing section 109 further refers to page cache management table and confirms whether there is using entry of the logical block same as that of the selected entry (S606).

When there is using entry of the logical block same as that of the selected entry, the page cache releasing section 109 performs "total removal process" for removing the data of the using entry having the logical address same as that of the selected entry with the data thereof (S607).

On the other hand, if there is no using entry of the logical block same as that of the selected entry, the page cache releasing section 109 performs "removal process" for removing the data of the selected entry with the data thereof (S608).

Then, the data matching flag of the entry treated with the removal process at S607 or S608 is set to "ON" (S609). In the case of the total removal process, the data matching flags of multiple entries are set to "ON".

(S610):

If there is untreated one among the entry (or entries) corresponding to the page cache number(s) designated by the access device 2, the process returns to S605 (S610).

(S611):

If there is no untreated one, the page cache releasing section 109 sets the use flag of the entry (or entries) corresponding to the page cache number(s) designated by the access device 2 to "OFF" to make the entry (or entries) corresponding to the page cache number(s) designated by the access device 2 as empty entry (or entries) (S611).

(S612):

At last, the page cache controlling unit 107 performs writing into the nonvolatile memory 12 in order to reflect the updated page cache management table information in the page cache information 124 (S612).

<<Total Removal Process>>

Figure 13:
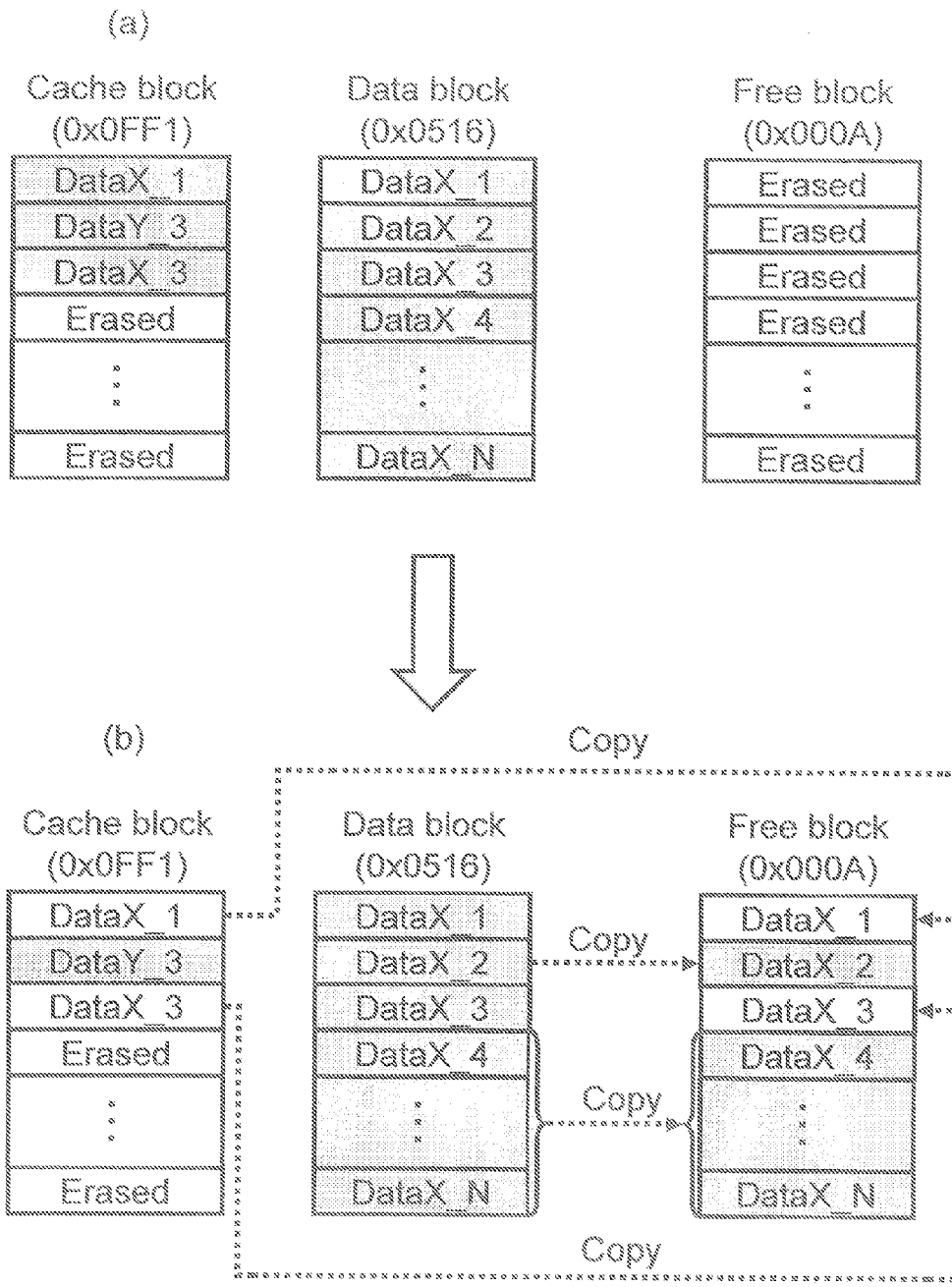
FIG. 13 An illustrative diagram showing an example of handling data of a cache block in a total removal process according to the first embodiment.

FIG. 13 shows an example of a writing state of a physical block before and after the total removal process at S607.

FIG. 13A shows a state before the total removal process.

The cache block (physical block number: 0x0FF1) stores three pieces of valid data of page cache ("data X_1", "data Y_3", and "data X_3"). The (logical block number, logical page number) of the page cache are respectively, (X, 1), (Y, 3), and (X, 3). All of them have the data matching flag set "OFF" on the page cache management table.

All three page caches (page caches which have "data X_1", "data Y_3", and "data X_3" as page cache object data) are designated by the access device 2 as object of page cache canceling and the first cache (X,1) is to be canceled its registration now.

The data block (physical block number: 0x0516) is a block of original in copying in the total removal process, and data of all the pages (1 through N) of the logical block number, X, ("data X__1" through "data X_N") are stored.

The free block (physical block number: 0x000A) is a block obtained with reference to the free block table, and has already been erased.

FIG. 13B shows a state after the total removal process.

States of the cache block (physical block number: 0x0FF1) and the data block (physical block number: 0x0516) are same as those in FIG. 13A.

To the free block (physical block number: 0x000A), the data of pages 1 through N of the logical block number X ("data X__1 through "data X_N") are copied. The data of page 1 and page 3 are in both the cache block (physical block number: 0x0FF1) and the data block (physical block number: 0x0516), and the data of the cache block (physical block number: 0x0FF1) is preferentially copied to the free block (physical block number: 0x000A). Since the other data are not in the cache block (physical block number: 0x0FF1), they are copied from the data block (physical block number: 0x0516) to the free block (physical block number: 0x000A).

After the total removal process, the free block (physical block number: 0x000A) is registered to the address conversion table on the RAM 102 and/or address conversion information 122 of the nonvolatile memory 12 as a new data block of the logical block number X. The original data block (physical block number: 0x0516) is registered as a free block to the free block table on the RAM 102 and/or the free block information 123 of the nonvolatile memory 12, and is reused.

As described above, in the total removal process, with the entry designated as page cache canceling object, data of other using entries (entries having using flag "ON") which have the logical block same as that of such entry (in FIG. 13, "data X__3") is copied. The data matching flag of multiple using entries of the same logical block (in FIG. 13, entry of "data X__1" and entry of "data X__3") are set to "ON" together. Accordingly, writing required for canceling page cache registration of the multiple using entries of the same logical block may be for one physical block (for all pages). In the nonvolatile storage system 1000, data corresponding to multiple using entries of the same logical block (page cache object data) can be copied to a free block together. Thus, a processing time can be significantly reduced compared to that in separately performing removal processes of data corresponding to multiple using entries of the same logical block (page cache object data).

In the case of FIG. 13A, canceling the registration of the second page cache (Y, 3) is the removal process at S608. Specifically, the cache block (physical block number: 0x0FF1) stores only "data Y__3" as the data of the logical block number "Y". Thus, when registration of the page cache (Y, 3) is canceled, the removal process at S608 is performed in the nonvolatile storage system 1000. Although not shown, in the removal process, only one page of the data to be written into the free block is the data of the page cache which is the registration canceling object (in FIG. 13, "data Y__3") and the other is the data of the data block. Accordingly, writing for one physical block (for all pages) is required for canceling registration of one page cache.

(1.2.1.7: Page Cache Information Outputting Process)

Figure 14:
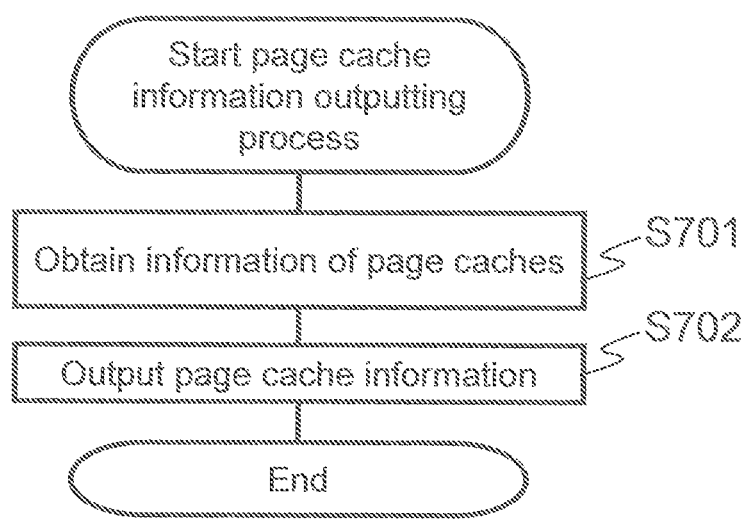
FIG. 14 A flow diagram showing a page cache information outputting process procedure of the nonvolatile storage device 1 according to the first embodiment.

FIG. 14 is a flow diagram showing the page cache information outputting process procedure of the nonvolatile storage device 1.

The access device 2 issues a command instructing page cache information output (hereinafter, referred to as "page cache information output command") to the nonvolatile storage device 1.

(S701, S702):

When the nonvolatile storage device 1 receives a page cache information output command from the access device 2, the page cache information outputting section 111 of the page cache controlling unit 107 refers to the page cache management table and obtains the current information regarding each of the page caches (S701). The page cache information outputting section 111 converts the information into the output format, and outputs to the access device 2 as the information regarding the page cache (S702).

<<Examples in Generating Information Regarding Page Cache>>

The followings are examples in generating the information regarding the page cache as mentioned above.

(1) The number of the logical addresses which can be registered to the page cache:

The number of the page cache numbers which can be registered to the page cache management table is output. In the example of FIG. 5, the number is "8".

(2) The number of the logical addresses registered to the page cache:

The number of the using entries which have the use flags "ON" which are registered to the page cache table is output. In the example of FIG. 5, the number is "6". The number of the empty entries which have use flags "OFF" may be output instead so that the use entry can be figured out indirectly.

(3) The information of the logical addresses registered to the page cache:

The logical block number and the logical page number which are registered to the page cache management table are output. Alternatively, the logical addresses calculated from these numbers (for example, sector addresses) may be output.

(4) The information regarding a time period for canceling page cache registration of the logical addresses registered to the page cache:

The information on the data matching flags registered to the page cache management table is output. Alternatively, time information is obtained from the information on the data matching flags and the obtained time information is output. A method for obtaining the time information from the information on the data matching flags may be, for example, obtaining "50 milliseconds at maximum" as time information when the data matching flag is "ON" and obtaining "250 milliseconds at maximum" as time information when the data matching flag is "OFF". When the data matching flag is "ON", the page cache registration canceling process is performed only by changing the use flag to "OFF". Since a saving process or copy process does not occur, a time period required for the page cache registration releasing process become shorter. Alternatively, the above time information may be predetermined based upon the property of the nonvolatile memory 12 of the nonvolatile storage device 1.

(5) The information regarding combinations of the logical addresses registered to the page cache which can be canceled the registration together in a predetermined time period:

Among the using entries which are registered to the page cache management table (entries having the use flags "ON"), combinations of the entries having the same logical block address are output. In the example of FIG. 5, page cache numbers #0 and #3 (both having logical block number "0x031A") and page cache numbers #2 and #5 (both having logical block number "0x21FE") have the same logical block addresses. Therefore, page cache numbers #0 and #3 and page cache numbers #2 and #5 are output as the "combinations which can be canceled the registration together in a predetermined time period" in the case shown in FIG. 5.

(6) The information regarding objects of a removal process of data of the page cache when the logical address registered to the page cache is canceled its registration:

The logical block number registered to the page cache management table, which is to be an object of the removal process, is output.

(7) The information regarding the number of data updates of the logical address registered to the page cache:

The value of the update counter registered to the page cache table is output.

(8) The information regarding the registration order among the logical addresses registered to the page cache:

The registration order history in registration to the page cache management table (not shown in FIG. 5) is output. The registration order history is updated at the page cache registration process. In such a case, the page cache management table holds the information regarding the registration order history. The "information regarding the registration order history" may be, for example, time information at page cache registration (time stamp), the numerical values indicating registration order, or the like.

(9) The information regarding the order of the most recent update among the logical addresses registered to the page cache:

The page cache update history registered to the page cache management table (not shown in FIG. 5) is output. The page cache update history is updated when writing to the cache block is performed in the data writing process. In such a case, the page cache management table holds the information regarding the page cache update history. The "information regarding the page cache update history" may be, for example, time information at a time when writing to the data block is performed in the data writing process (time stamp), the numerical values indicating states of the page cache update history, or the like.

(10) The identifier information of the logical address registered to the page cache:

The value of the page cache number in the page cache management table is output.

(11) The size information of the page cache:

The size of the physical page is output.

(1.2.2: Operations of Access Device)

Next, operations of the access device 2 are described.

(1.2.2.1: Content Writing Process)

Figure 15:
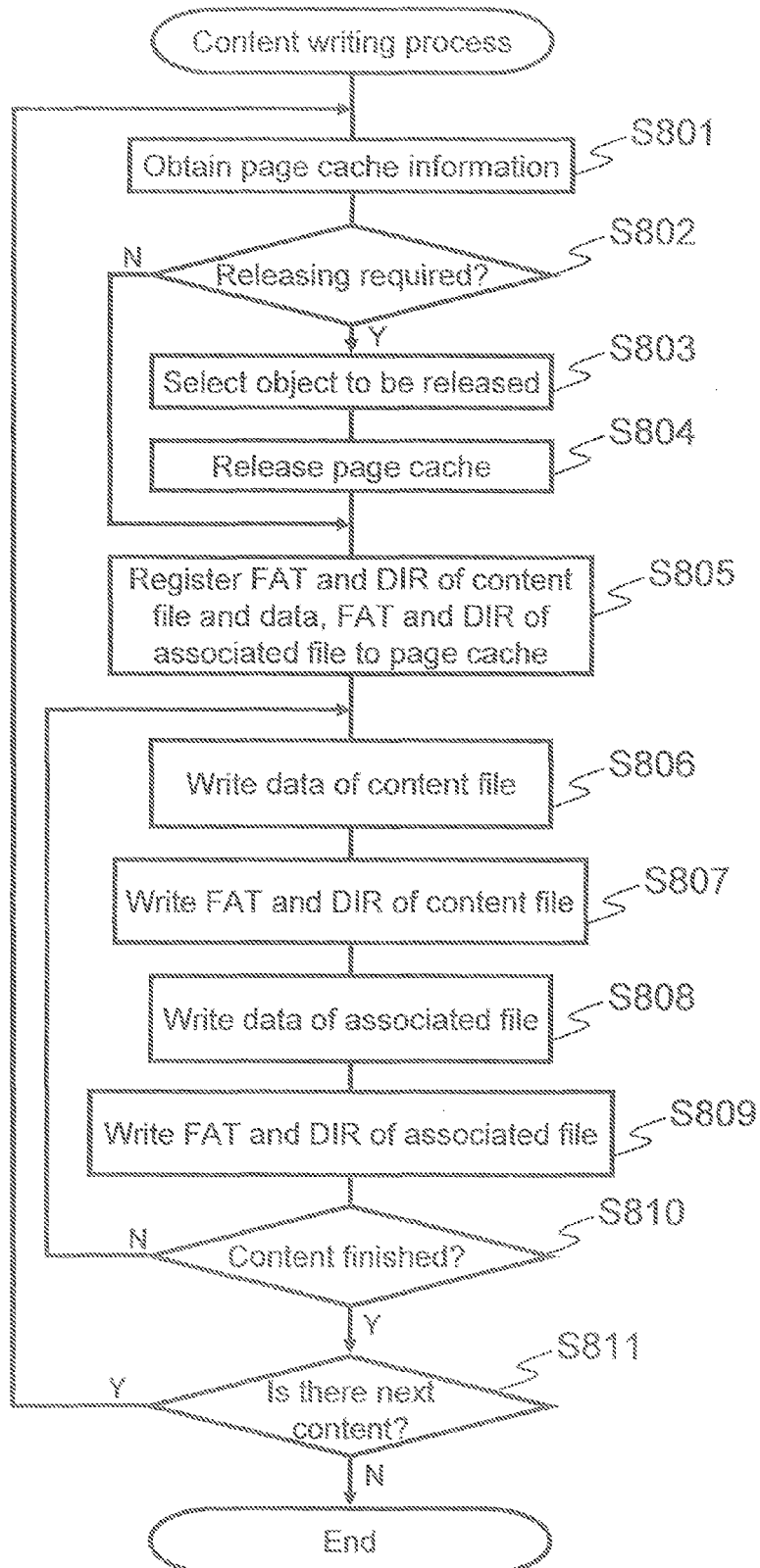
FIG. 15 A flow diagram showing a content writing process procedure of an access device 2 according to the first embodiment.
Figure 16:
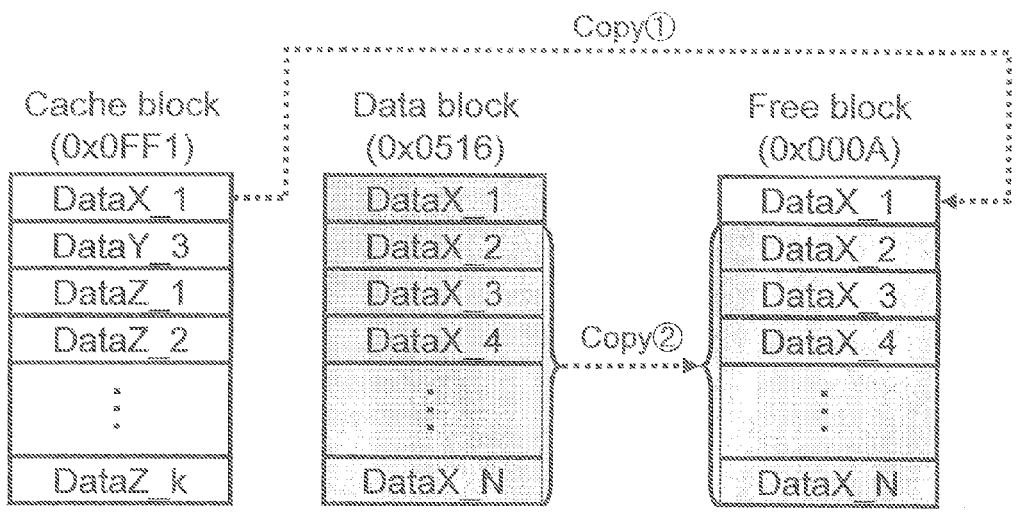
FIG. 16 A diagram for illustrating a process of moving data in page cache.
Figure 16:
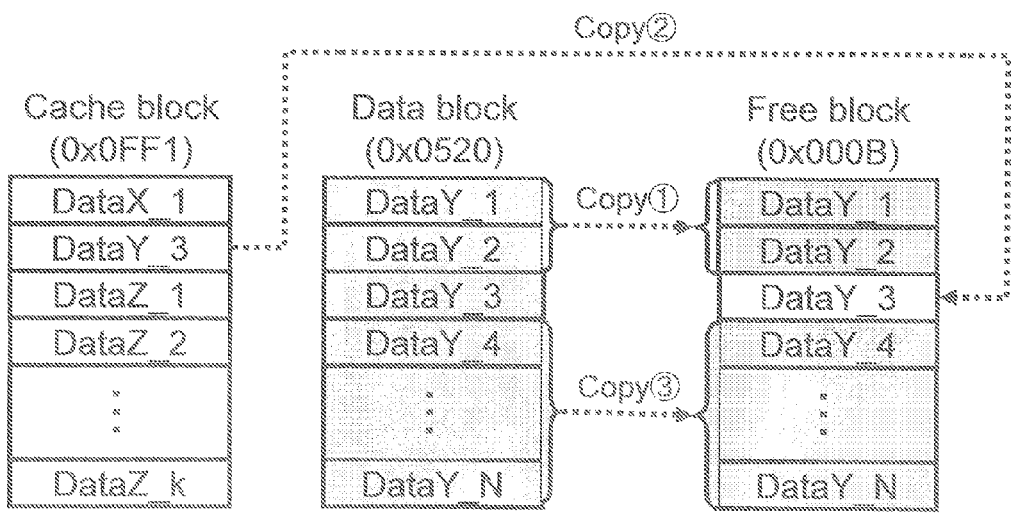

FIG. 15 is a flow diagram showing a content writing process procedure when the access device 2 writes contents into the nonvolatile storage device 1 mounted to the nonvolatile storage device interface 24, focused on the access to the nonvolatile storage device 1.

Before starting the content writing process, the access device 2 finishes the initializing process of the nonvolatile storage device 1 (for example, processes such as starting power supply, issuing an initializing command and the like) with a procedure same as the conventional one.

(S801):

The page cache information obtaining section 205 of thee access device 2 issues a command instructing page cache information output (page cache information output command) to the nonvolatile storage device 1 prior to writing data such as content files, and obtains the information regarding the page cache (S801).

(S802):

The page cache information setting section 204 determines whether canceling registration of the logical addresses which have already been registered as the page cache is required or not in view of the information obtained at S801, the number of the page caches which are going to be required for recording the content and the information on the logical addresses which have to be registered to the page cache (S802). If canceling registration of the logical addresses which have already been registered as the page cache is required, the process at S803 is performed next. On the other hand, if canceling registration of the logical addresses which have already been registered as the page cache is not required, the process at S805 is performed next.

(S803, S804):

If it is determined that canceling registration of the logical addresses which have already been registered as the page cache is required, the page cache number of the logical addresses of which page cache registration is canceled based on the information obtained at S801.

In this process, the "information regarding a time period for canceling page cache registration of the logical addresses registered to the page cache" is referred preferentially, and the time period for canceling page cache registration is selected preferentially. For example, the using entry having the data matching flag "ON" on the page cache management table also exists in the data block. Thus, if there is an entry having the data matching flag "ON" in the page cache management table, the page cache registration can be released by only changing the use flag from "ON" to "OFF" in the entry. In such a case, a saving process or copy process does not occur, and thus, the page cache registration releasing can be performed in a short processing time.

If it is required to further select objects of canceling page cache registration, the "information regarding combinations of the logical addresses registered to the page cache which can be canceled the registration together in a predetermined time period" is referred and the one with which as many logical addresses can be canceled registration. For example, in the case of FIG. 13, two logical addresses "X_1" and "X_3", i.e., data of the logical address of the logical block number "X", can be canceled registration together (canceled registration by the total removal process). Accordingly, only the writing process for one physical block is required, and page cache registration can be released in a short processing time.

If it is required to further select objects of canceling registration, the information such as the "information regarding the number of data updates of the logical address registered to the page cache", the "information regarding the registration order among the logical addresses registered to the page cache", and the "information regarding the order of the most recent update among the logical addresses registered to the page cache" are referred to select the object for canceling page cache registration (S803). For example, by canceling page cache registration from the entry having small number of times of update, or canceling page cache registration from the entry which has been registered before, it becomes possible to efficiently cancel the entries which are less likely to be updated. As a result, efficient page cache can be achieved in the nonvolatile storage system 1000.

The page cache information setting section 204 issues a command to instruct page cache registration canceling (page cache registration canceling command) with all the page cache numbers selected at S803 to the nonvolatile storage device 1, and performs canceling page cache registration (S804). In the present embodiment, the ones which have to be canceled page cache registration immediately are selected at S803, and the access device 2 issues the command in the synchronous mode. In other words, in the present embodiment, the access device 2 designates the synchronous mode, and, with the issued page cache registration canceling command, the page cache releasing section 109 starts the registration canceling process immediately when there is a request from the access device 2. The information regarding designating the synchronous mode/asynchronous mode may be included in the page cache registration canceling command, or may be sent from the access device 2 to the nonvolatile storage device 1 in another command.

Alternatively, if ones other than the ones which have to be canceled page cache registration immediately is included at S803, the access device 2 may separately sent a command for page cache registration canceling in the asynchronous mode to the nonvolatile storage device 1.

(S805):

Next, the access device 2 performs a process of registering page cache used in writing content files and/or files associated with the content files. The "files associated with the content files" may be, for example, files of data accompanied with the content (for example, name, thumbnail image, time search table, bit rate, reproduction time, encoding information and the like), files of data for searching the content, files of specific frames for video searching of the content or the like.

The page cache information setting section 204 issues a command to instruct page cache registration (page cache registration command) to the nonvolatile storage device 1 (S805). The logical address to be registered to the page cache may be, for example, the logical address of the FAT and/or directory entry of the content file, the logical address of the FAT and/or directory entry of the associated file, the logical address corresponding to specific data which is frequently overwritten of a file among the associated files or the like. These logical addresses are selected so as to be as close as possible. For example, they are selected to be within the same sector, same page cache, same logical block, or the like. This is because, when recording of the content is finished, canceling the registration of the page cache which has been used can be performed efficiently with the total removal process in the nonvolatile storage system 1000.

When page cache registration is completed, the writing process for the content is started.

(S806):

The access device 2 issues a command to the nonvolatile storage device 1, which instructs data writing for writing content data accumulated in the RAM 22 into the nonvolatile storage device 1, and transfers the writing data (S806). At this time, the process from S307 through S310 is performed in the nonvolatile storage device 1.

(S807):

After a certain amount of data has been written, the access device 2 issues a command which instructs data writing to the nonvolatile storage device 1 in order to update FAT and/or directory entry of the content file and transfer the writing data (S807). The writing addresses of these data (data of the FAT and/or directory entry of the content file) are registered as objects of the page cache. Accordingly, in the nonvolatile storage device 1, the process from S302 to S305 is performed.

(S808 Through S811):

Similarly, a command which instructs writing data, FAT and/or directory entry of the associated files is issued, and the writing data is transferred (S808, S809). Since the writing addresses of these data are also registered as objects of the page cache, the process from S302 to S305 is performed in the nonvolatile storage device 1.

The process from S806 to S809 is repeated until the content being recorded is finished (S810). After the content being recorded is finished, and it is necessary to continue recording for the next content, the process returns to S801. If it is not necessary to continue recording for the next content, the process is finished (S811).

As described above, in the nonvolatile storage system 1000, for canceling registration and registering a page cache by the access device 2 to the nonvolatile storage device 1, information regarding the page cache is previously obtained from the nonvolatile storage device 1 and the access device 2 can effectively selects an entry which suppress a time period required for the page cache registration canceling process to the minimum from the obtained information regarding the page cache. In this way, in the nonvolatile storage system 1000, a time period required for the page cache registration canceling process can be shortened. As a result, in the nonvolatile storage system 1000, a preparation time for content recording can be reduced.

The present invention has been described with reference to the above-described embodiment. However, the present invention is not limited to the above-described embodiment, and can be modified without being departed from the gist of the invention. The numerical values described in the present embodiment are merely examples, and other numerical values may be used. For example, values of the physical block size, page size and the like are merely examples, and are not limited to those described with respect to the present embodiment.

[Other Embodiments]

The following examples are also included within the present invention.

(1) In the access device, the nonvolatile storage device, the controller, and the nonvolatile storage system according to the above-described embodiment, the functional blocks may be formed into one chip independently, or some or all of them may be formed into one chip.

Herein, it is referred to as LSI, but depending upon the integration degrees, they may also be referred to as IC, system LSI, super LSI, ultra LSI, and so on.

Furthermore, the method of integrating circuit is not limit to LSI, but may be embodied as a special purpose circuit, or a general purpose processor. A field programmable gate array (FPGA), which can be programmed after LSI is manufactured, or a re-configurable processor, in which connections or settings or circuit cells inside the LSI can be reconfigured may be used.

Further, in advent of technology of integrating circuit replacing LSI due to advance in semiconductor technologies or other technologies derived thereof, the functional blocks may be integrated using such technology. Application of biotechnology is a possible example.

(2) The processes in the above-described embodiment may be performed by hardware or may be performed by software. Further, they can be performed by both software and hardware. When the distance estimating device according to the above embodiments are embodied by the hardware, of course, timing adjustment for each of the processes are needed. In the above embodiment, for the sake of convenience in description, details on timing adjustment of various signals which is required in the actual hardware design are omitted.

(3) The page cache in the above-described embodiment is described as being respectively formed of one page (corresponding to one page). However, the size of the page cache is not limited to this. For example, a virtual page may be formed by having multiple pages as the unit, and the page cache may be formed in these units of virtual pages. Alternatively, in the flash memories and the like, in which partial writing of multiple times to a page is permitted, the size of the page cache may be in units smaller than a page (for example, sector units).

Therefore, the "page cache" may also be simply referred as "cache".

The size of one page varies for different manufacturing processes, manufacturers, and the like of the flash memories. Therefore, by switching the structure of the page cache, the size of the page cache may be unified as a nonvolatile storage device. In such a case, the access device can expect page caches of the same size, and thus, designing becomes easier.

(4) The access device in the above-described embodiment selects the logical addresses to be registered to a page cache to be as near as possible in the content writing process. However, in the nonvolatile storage system, there may be a case in which the management information of the file system has been fragmented by repeating the writing and deleting of contents and it is difficult to select a near logical address, for example. Thus, in the nonvolatile storage system, it is possible to leave an option to perform defragmenting process (defrag) prior to selecting the logical address to be registered to the page cache so that the logical address can become near. Further, in the nonvolatile storage system, in order to reduce a time for defrag, an object area for the defrag may be limited to a part related to content recording (for example, a logical address where the FAT and/or directory entry of the content file are stored, a logical address where the FAT and/or directory entry of the file associated to the content are stored, and/or a logical address where specific data included in the file associated to the content (for example, data which is updated frequently) or the like are stored).

(5) The nonvolatile storage device in the above-embodiment has been described as an attachable/removable storage device such as a semiconductor memory card. However, it may be embodied as an information storage module which can be incorporated to a substrate of the access device. Further, the nonvolatile storage device and the access device do not have to be separate devices, and alternatively, the nonvolatile storage device and the access device may form a nonvolatile storage system together (as one device).

(6) In the above-described embodiment, the command instructing page cache registration canceling includes information of the page cache number. However, as long as the entry which is an object of the registration canceling is clear, the information do not always have to be the page cache number. For example, the logical address of multiple cache objects may be designated.

Further, means of having the nonvolatile storage device 1 cancel the registration of which of the entries on the page cache management table may be provided in the nonvolatile storage device 1. In such a case, the access device 2 may notifies the number of the entries which has to be cancelled registration.

INDUSTRIAL APPLICABILITY

The nonvolatile storage device according to the present invention can efficiently perform a process of changing an object area of a cache provided on a nonvolatile memory. Thus, a preparation time for recording content data can be reduced. This is optimal for semiconductor memory cards, of course, but also for access device such as PC applications, audio recorders, DVD recorders, HDD recorders, movies, digital still cameras, mobile phone terminals, and the like which are access devices handling digital contents such as videos, music, still images using the nonvolatile storage device such as semiconductor memory cards.

REFERENCE SIGNS LIST

1000 Nonvolatile storage system
1 Nonvolatile storage device
2 Access device
11 Memory controller
12 Nonvolatile memory
21, 101 CPU
22, 102 RAM
23, 103 ROM
24 Nonvolatile storage device interface
105 Nonvolatile memory interface
106 Address conversion controlling unit
107 Page cache controlling unit
108 Page cache registering section
109 Page cache releasing section
110 Page cache reading/writing section
111 Page cache information outputting section
121 Address management information
122 Address conversion information
123 Free block information
124 Page cache information
201 Application controlling unit
202 File system controlling unit
203 Nonvolatile storage device access unit
204 Page cache information setting section
205 Page cache information obtaining section

The invention claimed is:

1. A nonvolatile storage device for performing a reading process and/or writing process for data based on an instruction from an access device, comprising:
    a nonvolatile memory which includes cache block(s) and data block(s), and is configured to store data; and
    a memory controller configured to control data writing and data reading to and from the nonvolatile memory, in which, the memory controller includes:
        a cache registering section configured to register a received logical address as a cache object, in case of receiving an instruction of cache registration and a logical address of data which is to be a cache object from outside;
        a cache writing section configured to record writing data to the logical address which is registered as the cache object on a or the cache block of the nonvolatile memory;
        a page cache controlling section configured to manage information regarding the logical address registered as the cache object as a page cache management table, and set a data matching flag of logical address A1 to "ON" in case where the logical address A1 managed by the page cache management table as the cache object is copied to a or the data block by a saving process as an original of copy in the saving process so as to reflect a change in the page cache table; and
        a cache releasing section configured to preferentially release a logical address which is a cache object and has the data matching flag "ON" from cache objects among logical addresses registered as the cache objects when it receives an instruction of cache releasing from outside.

2. An access device for controlling data writing and/or data reading to and/or from a nonvolatile storage device including cache block(s) and data block(s), comprising:

a cache setting section configured to set logical address of data to be cache object to a nonvolatile storage device; and a cache information obtaining section configured to obtain information regarding a time period required for a nonvolatile storage device to release a logical address which is a cache object from the nonvolatile storage device wherein the cache setting section instructs the nonvolatile storage device to preferentially release a logical address which is a cache object and has a data matching flag, which indicates that there are same data in both the cache block and data block, "ON" in a page cache management table managed by the nonvolatile storage device.

3. An access device according to claim 2, wherein:

the cache setting section refers to the information obtained by the cache information obtaining section and instructs the nonvolatile storage device to preferentially release logical addresses which can be released together in a predetermined period of time for releasing multiple logical addresses which are cache objects.

4. An access device according to claim 2, wherein:

the cache setting section instructs the nonvolatile storage device to previously perform rearrangement of data in the nonvolatile storage device such that logical addresses which are cache objects become close to each other for registering multiple logical addresses which are cache objects.

* * * * *